United States Patent
Agrawal et al.

(10) Patent No.: US 11,720,534 B2
(45) Date of Patent: Aug. 8, 2023

(54) REMOTE CODE EXECUTION

(71) Applicant: SAP SE, Walldorf (DE)

(72) Inventors: PankajKumar Agrawal, Bangalore (IN); Hemant Mangal, Bangalore (IN); Mohit V Gadkari, Bangalore (IN)

(73) Assignee: SAP SE, Walldorf (DE)

( * ) Notice: Subject to any disclaimer, the term of this patent is extended or adjusted under 35 U.S.C. 154(b) by 94 days.

(21) Appl. No.: 17/205,953

(22) Filed: Mar. 18, 2021

(65) Prior Publication Data
US 2022/0300469 A1    Sep. 22, 2022

(51) Int. Cl.
*G06F 16/00*    (2019.01)
*G06F 16/21*    (2019.01)
(Continued)

(52) U.S. Cl.
CPC ............ *G06F 16/214* (2019.01); *G06F 9/541* (2013.01); *G06F 9/547* (2013.01); *G06F 16/1794* (2019.01); *G06F 16/211* (2019.01); *G06F 16/2386* (2019.01); *G06F 16/2445* (2019.01); *G06F 16/25* (2019.01); *G06F 16/258* (2019.01); *G06F 16/972* (2019.01);
(Continued)

(58) Field of Classification Search
CPC .. G06F 16/1794; G06F 16/211; G06F 16/214; G06F 16/2246; G06F 16/2386; G06F 16/2423; G06F 16/2445; G06F 16/25; G06F 16/258; G06F 16/972; G06F 9/45512; G06F 9/541; G06F 9/547; H04L 69/18
See application file for complete search history.

(56) References Cited

U.S. PATENT DOCUMENTS 7,171,432 B2    1/2007    Wildhagen et al.
7,263,698 B2    8/2007    Wildhagen et al.
(Continued)

OTHER PUBLICATIONS

De Gruyter et al., "Customize Through Extension and Over Layering," available from https://docs.microsoft.com/en-us/dynamics365/fin-ops-core/dev-itpro/extensibility/customization-overlayering-extensions, 18 pages (Sep. 2018).
(Continued)

*Primary Examiner* — Diedra McQuitery
(74) *Attorney, Agent, or Firm* — Klarquist Sparkman, LLP

(57) ABSTRACT

Methods and systems are disclosed for remote code execution between computing environments having various dissimilarities. Client requests at a source environment lead to calls of various types lacking immediate support within the source environment. Calls are delegated to the target environment, where function schemas, data schemas, or copies of source-side schemas are variously used to reconcile called source-side entities with their target-side counterparts. Inconsistencies between name and data representations and datatypes are also addressed. Serially communicated (JSON) parameters are resolved into required target-side multi-level parameter structures, and vice versa. Expedited bulk data access to/from a database layer is supported. A use case is described for phased migration of a software application. Generic and extensible remote code execution allows rapid migration, adaptation, or deployment of software applications across diverse computing environments.

20 Claims, 10 Drawing Sheets

(51) Int. Cl.
*G06F 16/23* (2019.01)
*G06F 16/242* (2019.01)
*G06F 16/25* (2019.01)
*G06F 16/178* (2019.01)
*G06F 16/958* (2019.01)
*G06F 9/54* (2006.01)
*G06F 16/22* (2019.01)
*G06F 9/455* (2018.01)
*H04L 69/18* (2022.01)

(52) U.S. Cl.
CPC ...... *G06F 9/45512* (2013.01); *G06F 16/2246* (2019.01); *G06F 16/2423* (2019.01); *H04L 69/18* (2013.01)

(56) References Cited

U.S. PATENT DOCUMENTS

| | | | |
|---|---|---|---|
| 7,814,470 B2 | 10/2010 | Mamou et al. | |
| 8,732,083 B2 | 5/2014 | Seubert et al. | |
| 8,868,582 B2 | 10/2014 | Fitzer et al. | |
| 8,990,836 B2 | 3/2015 | Kauerauf et al. | |
| 9,021,505 B2 | 4/2015 | Shankaranarayanan et al. | |
| 9,086,901 B2 | 7/2015 | Gebhart et al. | |
| 9,117,019 B2 | 8/2015 | Wintergerst et al. | |
| 9,191,389 B2 | 11/2015 | Jolfaei | |
| 9,430,505 B2* | 8/2016 | Padmanabhan | G06F 16/214 |
| 9,678,740 B2 | 6/2017 | Heine et al. | |
| 9,754,000 B2 | 9/2017 | Kreindlina et al. | |
| 9,817,645 B2 | 11/2017 | Nos et al. | |
| 10,038,698 B2 | 7/2018 | Mellor | |
| 10,162,821 B2 | 12/2018 | Seah et al. | |
| 10,404,579 B1* | 9/2019 | Biemueller | H04L 41/0803 |
| 10,430,167 B2 | 10/2019 | Maheshwari et al. | |
| 10,474,648 B2 | 11/2019 | Schreter et al. | |
| 10,817,285 B1 | 10/2020 | Hu | |
| 2004/0205731 A1* | 10/2004 | Junkermann | G06F 9/4488 717/136 |
| 2005/0091418 A1* | 4/2005 | Snover | G06F 9/45512 710/1 |
| 2007/0299975 A1* | 12/2007 | Daschakowsky | G06F 16/214 709/228 |
| 2008/0163269 A1 | 7/2008 | Goto | |
| 2010/0057673 A1* | 3/2010 | Savov | G06F 16/258 707/E17.002 |
| 2011/0282995 A1* | 11/2011 | Gass | G06F 8/65 709/246 |
| 2013/0054669 A1 | 2/2013 | Nachreiner et al. | |
| 2013/0167110 A1 | 6/2013 | Gross et al. | |
| 2015/0113498 A1 | 4/2015 | Wiese et al. | |
| 2017/0169083 A1 | 6/2017 | Subramanian et al. | |
| 2018/0095953 A1 | 4/2018 | Mayer et al. | |
| 2018/0232404 A1* | 8/2018 | Bhatti | G06F 16/9024 |
| 2018/0285390 A1 | 10/2018 | Mayer et al. | |
| 2018/0314719 A1* | 11/2018 | Subramanian | G06F 16/22 |
| 2019/0306138 A1* | 10/2019 | Carru | H04L 41/28 |
| 2019/0379612 A1 | 12/2019 | Tiwary et al. | |
| 2021/0224262 A1* | 7/2021 | Hermogenes | G06F 16/24556 |

OTHER PUBLICATIONS

Hilao, "Small, Medium-Sized Enterprises in the New Economy," available from https://insidesap.com.au/small-medium-sized-enterprises-and-sap-in-the-new-economy/, pp. 1-3 (Aug. 2020).
Jutras, "Accelerating Innovation with SAP Business Application Factory," available from https://www.sap.com/documents/2020/07/58dbe578-a47d-0010-87a3-c30de2ffd8ff.html, 10 pages (Jul. 2020).
Prause, "Taking the Long View, SAP Injects Innovation into SME Portfolio," available from https://news.sap.com/2020/08/business-application-factory-sap-sme-portfolio-innovation/, pp. 1-6 (Aug. 2020).
SAP, "Energize Your Business", available from https://www.sap.com/products/business-bydesign.html?pdf-asset=383db8df-897c-0010-82c7-eda71af511fa&page=4, 8 pages (Aug. 2020).
Wikipedia, "SAP Business ByDesign," pp. 1-3, downloaded from https://en.wikipedia.org/wiki/SAP_Business_ByDesign, on Feb. 26, 2021.
Extended European Search Report from Application No. 22162597.3, dated Aug. 9, 2022, 10 pages.

* cited by examiner

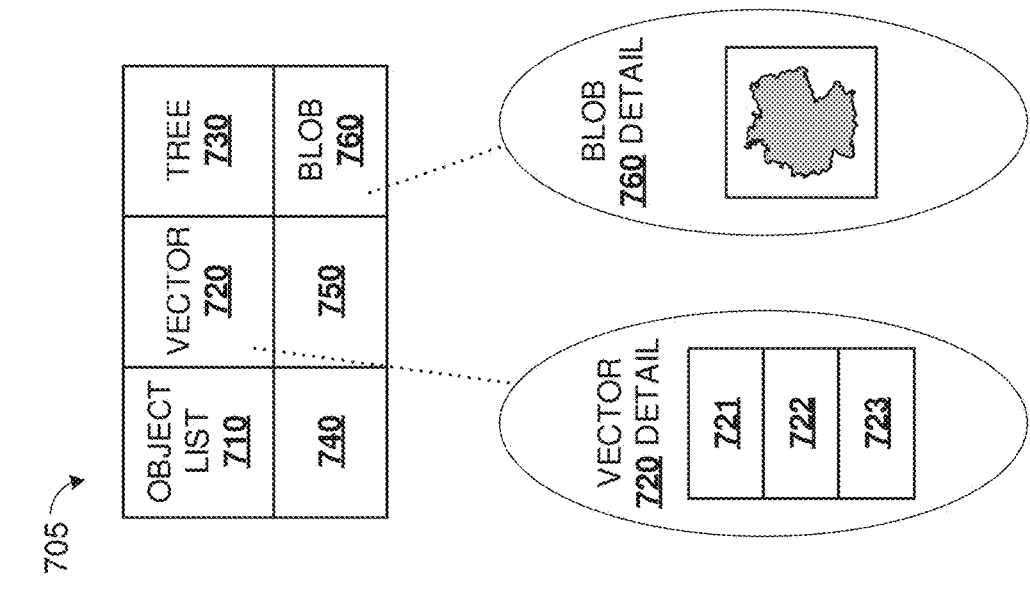
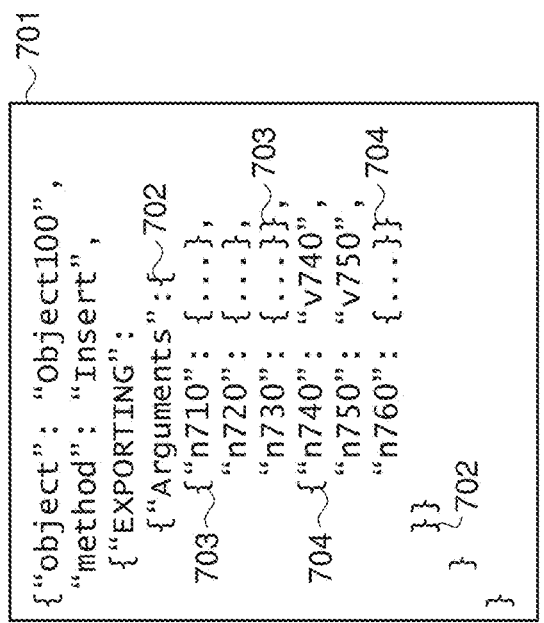
```
{"object": "object100",
 "method": "Insert",
 {"EXPORTING":
  {"Arguments": { ~702
703~ "n710": {...},
   "n720": {...}, ~703
   "n730": {...},
704~ "n740": "v740",
   "n750": "v750", ~704
   "n760": {...}}}
 }
}
             }~702
```
FIG. 7A
```
"n720":{
 "n721", "v721", "v722", "v723"
}                                706
```
FIG. 7C
```
"n760":{"image", "A13q+uY/5...33pf"}   707
```
FIG. 7D
FIG. 7B

```
"n710":{
 {"n711", "v711", "n712", "v712"},
 {"n713", "v713",
  "n714", "v714", "n715", "v715"},
 {"n716", "v716"}
}                                      708
```

```
001 "n730":{
002  "n731", "v731",
003  {"n732", "v732"},
004  {"n733", "v733",
005   {"n734", "v734"
006    {"n736", "v736"}
007  },
008  {"n735", "v735"}
009  }
010 }                                   709
```

REMOTE CODE EXECUTION

BACKGROUND

It is often desirable to execute program functions in one computing environment from a second environment using different data formats, standards, or protocols. Some conventional approaches can handle such disparities by implementing interface modules customized for each individual call or service to be executed, which can require a prohibitive amount of effort when hundreds or thousands of call are to be ported between computing environments, especially for small or medium scale software deployments. Accordingly, there remains a need for improved technologies supporting remote code execution between computing environments.

SUMMARY

In summary, the detailed description is directed to various innovative technologies for providing remote access to code on a target environment. In examples, a call from a source environment can be delegated to a target environment for execution on the target environment. The call can be transmitted from the source environment as a sequence of fields for objects, methods, or parameters of the call, represented according to a data schema of the source environment. At the target environment, a delegation handler can variously refer to target-side or source-side data schema to transform the sequence of fields into a call compliant with the target environment. In additional examples, the sequence of fields can be untyped or text, while the target-side call can be specified with typed or structured data. Results from target-side execution of the call can likewise be adapted to the source environment (e.g. with source-side names or untyped) and transmitted as a sequence of fields (e.g. text) to the source environment, where the call can be completed.

In certain examples, the disclosed technologies can be implemented as computer-readable media storing instructions executable on hardware processors. Execution of the instructions causes the hardware processors to perform the following operations. At a target computing environment, a request is received from a source computing environment for execution of a call. The request is parsed to identify a target entity and at least one source parameter. A schema of the target entity is received. Based on the schema, the at least one source parameter is transformed into at least one corresponding target parameter, and the call is executed on the target entity with the at least one target parameter.

In some examples, there can be a plurality of source parameters, and the request can include a serial sequence of untyped fields for the plurality of source parameters. The at least one corresponding target parameter can be a plurality of target parameters organized as a hierarchical data structure. The name of a given parameter of the at least one source parameter can differ from the name of the corresponding target parameter of the given parameter. The transforming can include applying a datatype, absent in the request, to a given parameter of the at least one target parameter. The operations can include adapting one or more return values of the executed call for compliance with the source computing environment, and transmitting the adapted return value(s) to the source computing environment.

In additional examples, the target entity can be a static function defined in the target computing environment. In other examples, the target entity can be a data object defined in the target computing environment and the parsing further can identify a method of the data object. In further examples, the target entity can be a logical data object.

In some examples, the request can be a bulk request for at least 1,000 data items stored in a database layer, and the executed call can bypass one or more intervening layers between an application layer and the database layer. The request can originate from a client of the source computing environment, and the operations can include receiving, at the target computing environment, information of the client's authorization at the source computing environment. The request can conform to a JSON format.

In certain examples, the disclosed technologies can be embodied as a system having a plurality of hardware processors, with memory coupled thereto, in first and second computing environments, together with computer-readable media storing at least the following instructions executable by the hardware processors. First instructions, when executed at the first computing environment, cause a bulk data request to be transmitted to the second computing environment in response to receiving one or more requests for data objects unavailable in the first computing environment. Second instructions, when executed at the second computing environment, cause first identifiers of the data objects in the bulk data request to be transformed into second identifiers of the data objects, using a local copy of a schema of the first computing environment. Third instructions, when executed at the second computing environment, cause the bulk data request to be performed using the second identifiers of the data objects. Fourth instructions, when executed, cause return values of the data objects to be adapted for compliance with the first computing environment. Fifth instructions, when executed, cause the adapted return values to be returned in response to the one or more requests.

In some examples, the first identifiers can conform to a first database schema specified in the first computing environment, and the second identifiers can conform to a second database schema used in the second computing environment. The first and second database schemas can be distinct. The transforming of the first identifiers can include incorporation, into the second identifiers, datatypes defined for the data objects in the second computing environment. The third instructions can be executed in an application layer, while the data objects can be available from a database layer. The bulk data request can be performed by the third instructions bypassing one or more intervening layers between the application layer and the database layer.

In certain examples, the disclosed technologies can be implemented by a computer, to migrate an application from a legacy computing environment to a new computing environment. Client requests are serviced through a user interface implemented in a user interface layer of the new computing environment. Serviced requests include requests for utility calls, requests for migrating data object calls, and requests for stationary data object calls. In a first phase, the utility calls, the migrating data object calls, and the stationary data object calls are delegated directly from the user interface layer to a delegation handler subsystem in the legacy computing environment. In a second phase, shells of migrating logical data objects are implemented in logical data object layers of the new computing environment, and the migrating data object calls are delegated from the logical data object layers of the new computing environment to the delegation handler subsystem, to be serviced by first logic of the migrating logical data objects in the legacy computing environment. In a third phase, second logic of the migrating logical data objects are implemented in the logical data object layers of the new computing environment, and the migrating data object calls are processed using the second logic, while the stationary data object calls are delegated from the logical data object layers of the new computing environment to the delegation handler subsystem, to be serviced by third logic of stationary logical data objects in the legacy computing environment.

In some examples, the delegation handler subsystem can incorporate a plurality of handlers accepting respective call types among the utility calls, the migrating data object calls, and the stationary data object calls. At least one call type among the utility calls, the migrating data object calls, and the stationary data object calls can be delegated by forwarding calls of the at least one call type with first identifiers as defined in the new computing environment, to be transformed by the delegation handler subsystem into second identifiers as defined in the legacy computing environment. In each of the first, second, and third phases, responses can be received from the legacy computing environment to complete the client requests at the new computing environment.

The foregoing and other objects, features, and advantages of the invention will become more apparent from the following detailed description, which proceeds with reference to the accompanying figures.

BRIEF DESCRIPTION OF THE DRAWINGS

FIGS. 7A-7F are diagrams illustrating an example of structured data reconstructed according to the disclosed technologies.

DETAILED DESCRIPTION

Overview

Figure 1:
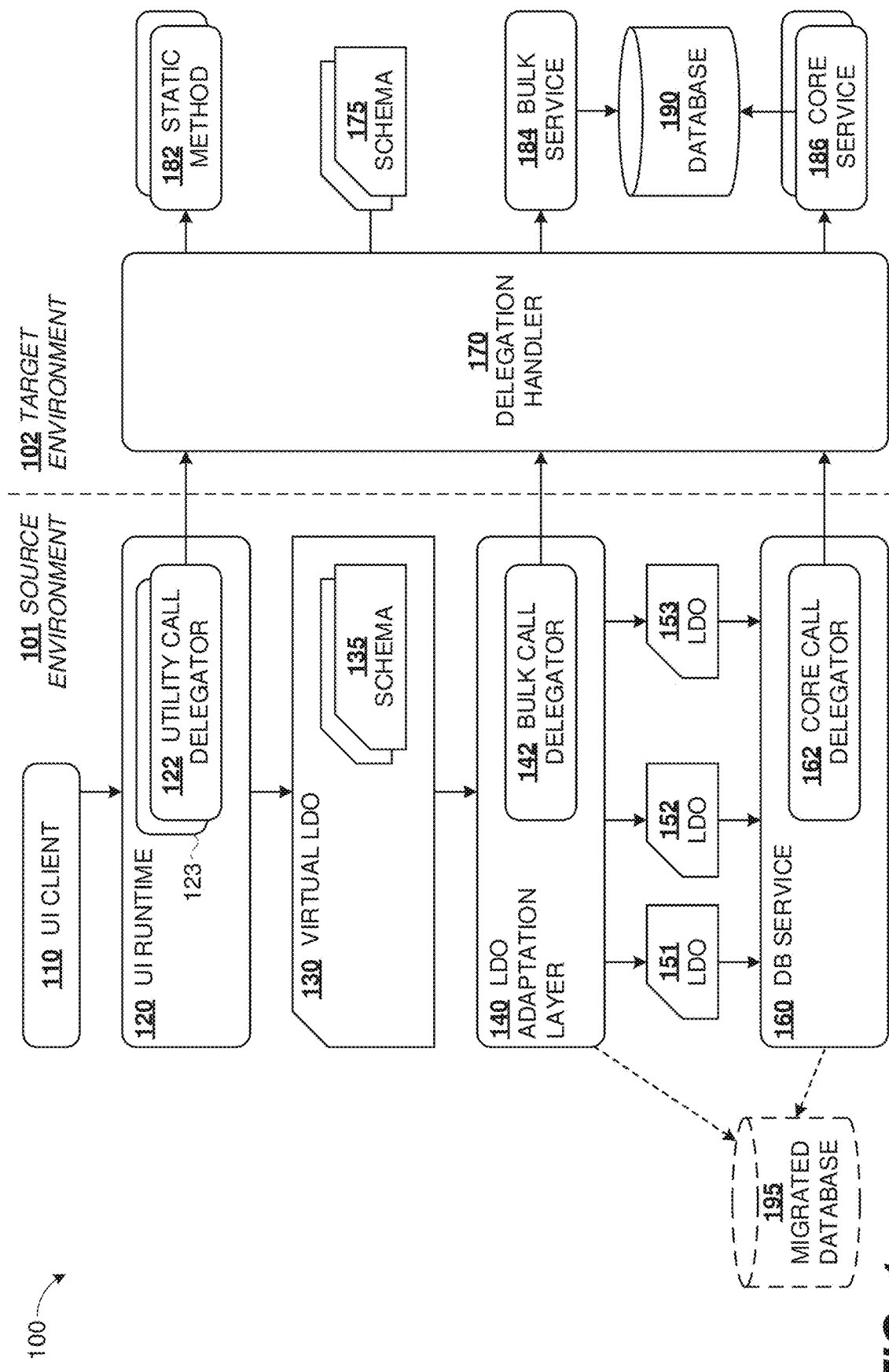
FIG. 1 is a block diagram of a first software architecture in which examples of the disclosed technologies can be implemented.

Remote code execution can be advantageous in a number of scenarios, including migration of applications to new software environments, development of new software applications based on legacy software applications, or simply to provide remote front-ends to existing systems. Migration can include scenarios where underlying software platforms or technologies are being updated; scenarios where functionality is being enhanced, reduced, or otherwise modified; or scenarios where an existing software installation is being replicated at a new site with no change in implementation or functionality. New software applications can be built using some or all existing software components, for example to customize an existing general-purpose software application for a small or medium enterprise. Remote front-ends can be deployed to provide improved user experience at a remote site while retaining back-end functions at an existing system. In some of these scenarios, a new environment can be located in physical proximity to an existing environment, whether in a data center or in the cloud, while in other scenarios the two environments can be at a considerable distance, or one can be in a data center while the other can be in the cloud.

In many such scenarios, it can be desirable for a new or remote software environment (dubbed "source environment") to be able to execute back-end code on a pre-existing target environment. Such a facility can reduce software development effort, as only a portion of the source environment required for performance can be locally implemented at the source environment, while other code can be retained at the pre-existing environment without significant loss of performance. Such a facility can alternatively provide phased migration, where a user interface can be provisioned at the source environment to quickly provide required functionality to users, while back-end data objects or logic can be provisioned in stages over a longer period of time.

However, conventional approaches to address such scenarios commonly require one of two approaches. In a first approach, the source software environment can be constrained to be identical to the existing environment, which can prohibit updates to technologies or schemas. In a second approach, custom interfaces can be developed for each remotely accessible function, which can require considerable development effort, negating any anticipated saving of effort, and can be unsuitable for all except large scale application deployments. In short, there are many scenarios which would benefit from flexible, transparent access to existing code from source environments employing different technologies or data models.

The disclosed technologies achieve such benefits through various combinations of generic communication between source and target software environments, minimal enforcement of 1:1 correspondence of e.g. data object names or static method names between the two environments, and the use of user interface schema, data schema, or other metadata to establish correspondence between data objects, call parameters, or other attributes that can be specified differently in the two environments.

1. Generic Communication

Generic communication allows target-side code to be executed from a source environment without definition of an application programming interface (API). Furthermore, a call handler receiving a remote request can also be implemented generically. That is, a call handler implemented for two functions can be freely extended to five, dozens, or hundreds of functions with no modification. In some examples and as a matter of convenience, the generic communication can be in the form of serial text strings, however this is not a requirement, and binary or other information encodings can be used. As a further convenience, the serial text can be organized as a JSON packet, for which developer tools are widely available, but this too is not a requirement, and other technologies such as YAML or Protocol Buffers can also be used.

2. Name Matching

In some examples, data object names can be preserved between environments, which can facilitate mapping subordinate object names or parameters between the environments, in addition to minimizing developer confusion. To illustrate, a Bill_Of_Materials data object can have the same name in a target environment and in a source environment. Inasmuch as a name is a human-readable attribute of some underlying data object, the choice of name does not constrain any changes to technology or platform between the two environments.

Still, in other examples, the two environments can employ different coding styles or different programming paradigms. To illustrate, a target environment may utilize upper-case naming with underscore delimiters, thus BILL_OF_MATERIALS, while the source environment may use camel-case names, thus BillOfMaterials. In such examples, new environment names can be mandated to reduce to the same string as the target environment name under a predetermined transformation such as: conversion to lower-case and elimination of delimiter characters. In the above illustration, both source and target names would reduce to "billofmaterials", allowing for straightforward pattern matching between the source environment name of a data object and the intended target object, even if the literal text strings are not identical or have different length.

In further examples, data object names can be further divergent between environments. Rules can be incorporated into name transformations, for example to apply text substitution (e.g. "Qty"→"Quantity" or "Locale"→"Country") or to remove prefixes in name strings, so as to accommodate diverging patterns in naming conventions. In some examples, a source environment can have a single namespace, with all data object names uniquely specified relative to a root of the namespace, while a target environment can have names of data items referenced to respective top level data objects, rather than to a unique root. Prefix removal can address such a variation in naming style between the two environments. Still further, look-up tables can be used for names failing to match by the above techniques, or where very similar names can lead to mis-identification.

Although the discussion above pertains to names of data objects, similar considerations apply to matching names of functions or argument parameters across two environments. Furthermore, the level of name mismatch can vary between examples of the disclosed technologies. In some examples, one of the environments can support two name styles interchangeably, while the other environment supports just one of the two name styles. In situations where name conversion is required, pre-existing routines can be used directly. In other examples, a source environment can support target-side names in all except a finite list of exceptions. The exceptions can be converted using a look-up table.

3. Schema

In some examples, schema can be used to reconcile names between environments, identify defined functions for a particular class or data object, identify datatypes or other metadata associated with data objects and functions, or determine a mapping between data objects and their parameters on one hand, and their database layer representations on the other hand. For delegation of utility calls and core calls, source-side schema can suffice to resolve and execute the requested calls. However, for bulk calls, a copy of target-side schema can be used to obtain the necessary database layer mapping as described further herein.

4. Example Use Case

In an example use case, the target environment can be an SAP Business ByDesign installation, e.g. for enterprise resource planning software applications, and the source environment can be an SAP Business Application Factory installation. Particularly, with the disclosed technologies, enterprise applications can be customized and rolled out to small and medium enterprise customers with speed and efficiency that was previously not possible at this scale.

Terminology

An "application" or "software application" is a computer-executable program performing functions for one or more clients, and can be distinct from an operating system, a software library, a test suite, or a development environment. Additionally, some applications can operate without clients, e.g. launched by a supervisor or another application, performing tasks autonomously or in an event-driven mode. An application can include both executable instructions (dubbed "code" or "program code") and non-executable data (dubbed "application data" or "program data"). An application can have one or more engines (dubbed "back-ends") performing the work of the application (e.g. performing underlying data operations, maintaining state, generating or responding to requests, and so forth) and can provide one or more interfaces (dubbed "front-ends", sometimes a "user interface" or "UI") for clients or users.

"Authentication" refers to a process of verifying a user's credentials so as to allow the user, or an associated client, access to a secure resource, according to that user's authorizations.

"Authorization" refers to a permission granted to a given user to have a given level of access to a given resource, or to an act of configuring such permission. Authorization can be enabled or disabled. The level of access can be restricted to specific forms of access, e.g. read-only, or can be unrestricted.

"Call" refers to invocation of a software function or service. Some calls described herein include calls to functions defined for particular data objects and are dubbed "data object calls", including "core calls" and "bulk calls" (sometimes "bulk data calls"). For instance, a method defined for a class can be invoked on an instance of that class. Commonly, a data object call can specify a data object, a function defined for that data object, and zero, one, or more optional "argument parameters." A response to the data object call can provide zero, one, or more "return parameters." Generally, a core call can invoke a function for one data object, while bulk calls can invoke same or different functions aggregated over multiple objects. In some disclosed examples, bulk calls and core calls can be handled differently. Other calls dubbed "utility calls" can invoke stand-alone functions (dubbed "static functions") defined independently of any particular data object (although argument parameters and return parameters for a static function can be data objects). Commonly, a utility call can specify a static function and one or more optional argument parameters. Exemplary utility functions can include date and time functions; conversion functions for physical quantities or currencies; or arithmetic or statistical functions. A response to the utility call can provide one or more return parameters. Some static functions can be static methods of a class and can be specified by the name of the class and the name of the defined static method. A call can have a "target entity", which can be the data object for a data object call, or the static function for a utility call.

"Completion" of a call refers to an action taken upon receipt of return parameters from a call. For example, execution of a statement x=Square (3) can invoke a utility call to a static function Square (arg) with argument arg=3, which returns 9. Assignment of the return value 9 to variable x can represent completion of the utility call to Square( ). In other examples, a call may have no return parameter, and completion of such a call can refer to incrementing a program counter upon termination of the call.

A "call type" identifies a type of a given call. Some call types of interest in this disclosure include utility calls, core calls, and bulk data calls, however the disclosed technologies are not so limited. In varying examples, other, fewer, or additional call types can be supported.

A "client" is a hardware or software computing entity that uses a resource provided by another hardware or software computing entity dubbed a "server."

A "cloud" is a multi-processor computing resource, accessible off-premises to multiple clients or users over a public network such as internet, in which the clients or users may not have control over which particular processors their applications are executed on.

A "computing environment" or simply "environment" refers to a combination of hardware (e.g. processors, memory, storage, network interface) and software (e.g. operating system, utilities) on which a software application can be run. Two environments are distinct if one environment can continue to run (except for communication between the environments) while software of the other environment is shut down. For convenience of description, entities belonging to a given environment X are sometimes qualified as "X-side" or simply "X" herein. Thus, "source-side schema," or "target parameter."

The unqualified term "data" refers to any digital representation of information.

A "data object" is an instance of a datatype that occupies some memory at runtime for storage of data which is directly or indirectly accessible to a software application. Data objects can variously be tables, records, fields, or other entities in a database system; atomic data items; instances of classes in an object-oriented environment; or logical data objects. Some data objects can have associated functions defined.

A "database" (DB) or "database system" is an organized collection of data maintained on computer-readable media and accessible by execution of instructions at one or more processors. Databases can be relational, in-memory or on disk, hierarchical or non-hierarchical, or any other type of database. A database can store an original or master copy of one or more data items.

A "datatype" is a definition or specification of a type of a data object. A datatype can be simple or primitive, meaning that it is not composed of smaller entities. Logical or Boolean variables, integers, and floating point variables are primitive datatypes in many computer languages. Likewise, many computer languages have either characters or strings as primitive datatypes. Complex datatypes can be composed of smaller entities, which can be simple datatypes or other complex datatypes. Classes and structures (e.g. tables, linked lists, trees) are examples of complex datatypes. Call parameters provided without an indication of their datatype are dubbed "untyped."

"Delegation" refers to an act of issuing a call (i.e. a request to execute the call) from a first environment dubbed a "source environment" to a distinct environment dubbed a "target environment," for processing and execution of the call at the target environment. A software component issuing the call is dubbed a "delegator" and a target-side component receiving the call is dubbed a "delegation handler" or simply "handler." A delegation handler can be a single component, or can be a subsystem incorporating various "endpoints" to which respective delegated call types can be directed. A handler can receive a delegated call, transform the received call for compatibility with the receiving environment, and can forward the transformed call to an appropriate software component in the receiving environment to be executed or otherwise fulfilled.

A "function" is an executable software module that, when executed, takes an input and optionally generates a corresponding output. The input and output can be of a same or different datatypes, and these datatypes can be simple or complex datatypes, in any combination.

A "layer" is an organizational unit of a software application or environment, in particular as one among an ordered sequence of organizational units. Generally, a layer can provide data or services to a layer above it, and in term can rely on data or services of a layer below it. A topmost layer can provide an externally accessible interface to a client, user, or another software application. A bottom-most layer can avail of utility or operating system services in the instant environment.

A "logical data object" (LDO) is a collection of data together with associated methods. That is, the word "object" in LDO has a similar connotation as in object-oriented programming, where data is packaged with methods to support, among other features, data hiding. From another perspective, an LDO presents data items in terms of functions supported by the LDO. Access to LDO data items can be performed through the LDO's own access methods rather than through detailed knowledge of underlying relational databases or data structures. However, for efficiency, it can sometimes be desirable to access the underlying databases or data structures directly. That is, high-level and low-level access methods for the data of an LDO can co-exist. The data of an LDO can be organized within a relational database, another database or data structure, or as documents in a document management system, in any combination. LDOs also differ from classical objects of object-oriented programs in important ways. For example, an LDO exists as a stand-alone entity, and is not limited by the scope or lifetime of a particular software program. Further, two LDOs can share some of the same data. An LDO can be defined according to a schema, or can be dynamically extended, as by adding new records or tables to an existing LDO.

"Metadata" can refer to an attribute of a data object that indicates a property of the data object but is not stored within the data object. Metadata of a function can refer to any attribute of the function, its argument parameters, or its return parameters that does not occupy storage space within the body of the function. Function metadata can include definitions, names, or datatypes of its argument parameters and return parameters. Metadata of a software application can include configuration data that can control operation of the program.

"Migration" refers to a process of moving or replicating some or all functionality of a software application from one computing environment to another. Migration can often be accompanied by changes in software technology, languages or coding standards, or an underlying hardware or software platform; or adaptation or enhancement of functionality; however, none of these are requirements. Migration can also be undertaken solely to copy all or part of an existing software application, for example to provide additional capacity, to provide a host closer to certain clients, or to provide a dedicated installation for a particular customer. In some disclosed examples, migration can be performed in phases, with limited functionality (commonly a front-end)

migrated quickly, and other functionality (commonly back-end) migrated in subsequent phases.

The terms "receive" and "transmit" refer to communication over a network, which can be in the form of a message. The communication can be electromagnetic, e.g. over wired, wireless, or optical media, but this is not a requirement.

The term "remote" refers to software functionality supported or executed in a distinct computing environment from where the functionality is accessed or used. The term extends to either of the two computing environments from the perspective of the other computing environment. In some examples, two computing environments characterized as remote from each other can be physically remote, i.e. housed in different data centers, different geographic locales, or one in a data center and one in the cloud, however this is not a requirement. Descriptions of remote computing environments herein can extend to co-located computing environments, either in a common cloud landscape or in a common data center. In further examples, the physical proximity of two "remote" cloud-hosted computing environments can be unknown.

A "request" is a message to which a substantive response ("response") is expected, that is, a response beyond an acknowledgment. A request can also be a message for which a recipient of the message is expected to take a specified action. In contrast, a "notification" need not receive a substantive response, nor result in any specific action.

A "schema" is a specification of software entities associated with a software application. A "data schema" can define names, types, or relationships between data objects, databases, or components thereof. An "interface schema" can define interfaces to data objects, other interface functions, or views available on the data objects. A "function schema" can define calling syntax, parameter datatypes, or other metadata associated with a function. A software application can have an "application schema" including all or part of the data schema, the interface schema, or associated function schemas, and can contain additional metadata indicating configuration parameters of the software application, including routing for associated call types.

The terms "serial" and "sequential" refer to a linear ordering of items in space or time, such that for any two of the items, one precedes the other.

A "server" is a computer, implemented as hardware on which software is executed, providing a service or access to a resource for at least one client, and often for a plurality of clients. In this disclosure, servers can host software applications, LDOs, databases, front-end or back-end logic, services, user interfaces, or can provide other functions.

The verb "service," in context of a call can refer to any act or combination of acts that lead to execution or completion of the call. Thus, servicing a call can include, without limitation, routing the call at either the source or target environment, delegation of the call from source to target environment, transformation of the call for compliance with the source environment, execution of the call, and similar acts for responding to an originator of the call request after the call has been executed.

"Software" refers to computer-executable programs or instructions and associated data structures. Software can be in active or quiescent states. In an active state, software can be loaded into memory, or can be undergoing execution by one or more processors. In a quiescent state, software can be stored on computer-readable media, awaiting transmission or execution.

A "string" is a sequence of characters.

The term "target" refers to any software, environment, function or data object on which calls are sought to be remotely executed.

"Text" is a representation of one or more words (e.g. "apple"), or printable characters (e.g. "01.01.2020"), which convey semantic meaning. The meaning can include as an identifier of a software entity or e.g. a Base64 representation of a binary large object (BLOB). Text can often be an electronic representation. Electronic text can be stored in memory or on a storage device, with suitable encoding, and can also be encrypted.

"User interface" (UI) refers to hardware or software enabling a user or client to interact with a computer system or software application. A user interface can be graphical, e.g. presented as a web page on a browser, as an app e.g. on a mobile device, as an application programming interface (API), as a text-mode console, as a voice response, or another form. Input provided through a UI is dubbed "user input." In some disclosed examples, a UI runtime can be hosted on a server, and a UI client can be hosted in a browser on a user's computing device. The UI runtime and the UI client can communicate using an API of the UI runtime, JavaScript, or other browser compatible technologies.

First Example Architecture

FIG. 1 is a block diagram 100 of a first software architecture in which calls from a source environment 101 can be executed at a target environment 102. As described further herein, embodiments can implement varying combinations of the features illustrated in FIG. 1, or can implement illustrated features at varying times, such as during migration of software applications from the target environment 102 to the source environment 101. For convenience of illustration, directional arrows are shown indicating flow of execution from receipt of a client request on the source environment 101 to execution of an associated call at the target environment 102. Generally, a substantive response or notification resulting from call execution can return in a reverse direction along the depicted arrows. Further, rectangles with rounded corners are sometimes used in FIG. 1 to indicate components of the illustrated software environments having executable software, while rectangles with beveled corners are sometimes used to indicated data objects. However, such distinction is merely for clarity of illustration. A skilled artisan will understand that executable software components can often have attendant data objects, while data objects, such as logical data objects, can have attendant executable software. Databases 190, 195 can also represent database systems having internal executable software.

As illustrated in FIG. 1, three logical paths couple delegators 122-123, 142, 162 to a target-side delegation handler subsystem 170. The source-side use of these delegators to issue calls to the target environment and the handling of such calls in the target environment will be described in turn.

The source-side components of FIG. 1 can be regarded as a layer stack, from a user interface client UI 110 at the top to a database service layer 160 at the bottom. A software application can be served from source-side UI runtime 120 to UI client 110 which can be implemented in a browser such as a web browser or a dedicated portal for the instant software application.

Through client 110, a user can issue a request to UI runtime 120. UI runtime 120 can parse the received user request to identify one or more calls required to fulfill the request, and can further determine a call type for each of the identified calls.

In varying examples, the received request can be fulfilled with one, two, or more calls. To illustrate, a request can require read, modify, or write of a single database item and can be fulfilled with a single call. A more complex request can require a first utility function call to construct an argument for a second call, which can be a conditional check of a database item. One or more further database calls can be triggered based on the result of the conditional check. As another illustration, a single request to refresh a list of displayed items can be implemented as multiple calls. Additionally, some requests can be fulfilled without any call. In some instances, administrative requests such as for system status or version can sometimes be responded to immediately by the UI runtime 120, as can ill-formed requests or requests for unavailable services.

UI runtime 120 can act as a server for a user interface presented at UI client 110, and can also incorporate one or more delegators 122-123. Utility call delegator 122 is labeled, however other delegators 123 can also be implemented, as described further herein. Each call can be routed according to its call type, e.g. to a respective delegator 122-123, to a virtual LDO 130 of the instant software application. UI runtime 120 can also incorporate a UI acceleration engine providing reduced latency for UI functions such as page scrolling. The acceleration engine can also be coupled to virtual LDO 130.

A software application can be presented as a logical data object 130, comprising data in the form of relational database tables or other data structures, together with access methods or views. As illustrated, LDO 130 can be a virtual LDO, synthesizing respective portions of underlying LDOs 151-153 in the source environment 101. To illustrate, an instant software application can support procurement functions for an automotive assembly plant. A virtual LDO 130 for this application can draw upon LDOs 151 for vendors, 152 for plant inventories, and 153 for parts specifications and approved part substitutions. Because each LDO 151-153 can also be employed for other software applications, it can be desirable to maintain LDOs 151-153 independently, rather than refactoring the LDOs specifically for the instant assembly plant. As a matter of best practice software design, virtual LDO 130 allows LDOs 151-153 to be maintained independently, while presenting a unified LDO appearance customized to suit the instant software application.

Virtual LDO 130 can incorporate one or more schemas 135. For example, an interface schema 135 can define interfaces or views exposed by UI runtime 120, or a data schema 135 can specify the organization of data within LDO 130, or mapping between attributes of LDO 130 and corresponding attributes of the underlying LDOs 151-153. Based on schemas 135, calls routed from UI runtime 120 to the LDO 130 can be routed through LDO adaptation layer 140.

In some examples, a target environment can implement an expedited processing facility for requests for bulk data operations, as described further herein. To replicate such a facility from the source environment, a call for bulk data can be delegated directly from adaptation layer 140 using bulk call delegator 142. Other calls can be routed to the appropriate underlying LDO 151-153.

The data and interface schemas of virtual LDO 130 can differ from the associated schemas of underlying LDOs 151-153. Thus, the bulk calls routed via delegator 142 to the target environment 102 can be specified according to data and UI schema 135, rather than according to schemas of underlying LDOs 151-153.

In some situation, an LDO 153 can include metadata (e.g. data schema, interface schema, or configuration data) but no logic. Such a situation can arise as an intermediate phase in a phased migration, or in situations where LDO 153 is merely a source front-end for an LDO whose back-end is being retained at the target environment. The latter situation can be used to preserve a single point of logic maintenance an LDO being reused across multiple environments. Where LDO 153 has no logic, an instant call can be routed transparently through LDO 153 to the database service layer 160, and this call can be delegated to the target environment 170 via core call delegator 162. Unlike bulk calls, core calls can be referenced to data schemas of LDOs 151-153.

In other situations, an LDO 151 can include metadata and logic, and the call can be processed using the internal logic of LDO 151. Often, one or more database service calls may be required to complete the call handling logic of LDO 151, and these can be routed to the database service layer 160 for fulfilment at an underlying database.

Numerous variations and extensions of the source environment 101 can be implemented. For example, routing of calls can evolve over a phased migration of a software application. The software components of the source environment can be configured by source-side configuration parameters or by modifying code of the source-side components. To illustrate, at an early stage of application migration, source-side components 130, 140, 151-153, or 160 can be absent, and all calls can be delegated via delegators 122-123 to target-side delegation handler 170. As a further illustration, application migration can include migration of all or part of target-side database 190 to source-side migrated database 195. Cut-over from target database 190 to migrated database 195 can be supported by update of code or configuration parameters at adaptation layer 140 or database service layer 160, so that bulk calls or LDO data service calls are routed appropriately. A single source environment 101 can support multiple software applications, with respective virtual LDOs 130, and independent or shared UI runtimes 120 or UI clients 110. A single UI runtime 120 can support multiple UI clients 110. A given virtual LDO 130 can be supported by any number of underlying LDOs 151-153, even just one. Where there is just one underlying LDO 151, a schema 135 of virtual LDO 130 can provide views not present in LDO 151, or can limit the exposed data and interfaces to only those required for an instant software application.

Turning to the target environment 102, delegated calls from call delegators 122-123, 142, 162 can be processed as described herein and routed to appropriate target-side methods, services, or LDOs for fulfillment. Commonly, utility calls can be handled by static functions 182, without recourse to a database or LDO. Bulk calls can be handled by bulk service 184, which can directly access target-side database 190. Core calls to data objects can be handled by core services 186, and can ultimately be fulfilled at database 190, with or without processing by target-side LDO logic (not shown).

Numerous variations and extensions of the target environment 102 can be implemented. For example, delegation handler 170 can incorporate facilities for adapting received calls into a form compliant with the target environment, to overcome inconsistencies between data representations, data organization, or naming between the two environments 101, 102. As described further herein, delegation handler 170 can employ target-side or source-side schemas 175 (data schemas, interface schemas, or function schemas) to perform such adaptation. As another example, delegation handler 170 can incorporate multiple endpoints for receiving various call types from the source-side delegators 122-123, 142, 162. Still further, a single target environment 102 can support multiple source environments to which same or different software applications are being deployed. The multiple source environments can be coupled to the same or different delegation handlers 170, in any combination.

First Example Method

Figure 2:
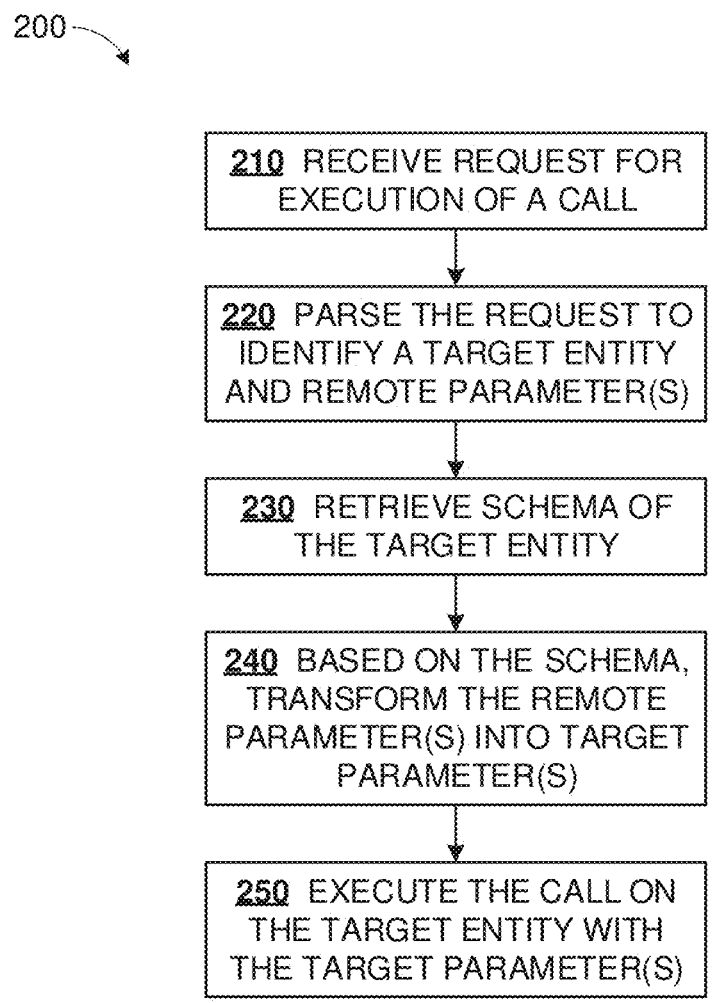
FIG. 2 is a flowchart of a first example method according to the disclosed technologies.

FIG. 2 is a flowchart 200 of a first example method according to the disclosed technologies. In this method, a call received at a target environment is transformed to conform with data specifications of the target environment.

At process block 210, a request for execution of a call can be received at a target environment from a source environment. At process block 220, the request can be parsed to identify a target entity and one or more argument parameters passed from the source environment according to a source-side schema. Then, at process block 230, a schema of the target entity can be retrieved locally on the target-side. The schema can be used at process block 240 to transform the source-side argument parameter(s) into corresponding target-side parameters conforming to target-side schema. At process block 250, the call can be executed on the target entity with the target-side parameter(s).

Numerous variations and extensions of this method can be implemented. For example, the request can be received in a serial format, which can be encoded as text, such as JSON. Multiple source parameters can be received as a serial sequence of fields. In some examples, the fields can contain untyped parameters, while in other examples, parameter values and datatypes can both be provided. In further examples, the target parameters can have associated datatypes or can have associated structure, such as a hierarchical data structure, a list, or a table. In some examples, the structure of the target parameters can be decoded directly from the serial sequence of fields using e.g. brackets embedded in the serial field sequence to denote nesting of fields. In other examples, the structure of target parameters can be identified without brackets based on a schema of the target entity. A source parameter can be specified as a key-value pair, with the key indicating a source-side name of the parameter, and the value of the key-value pair indicating the value of the parameter. The source-side name of the parameter can be different from the target-side name of the parameter. The transformation at block 240 can include applying a datatype to the target parameter which was absent in the received request.

In some examples, the target entity can be a static function, such as for a conversion of an input value to a different representation or unit. To illustrate, a static function can convert between representations of time, e.g. between time zones or between universal time, a time zone, or a calendar representation of time. In other examples, the target entity can be a data object, such as a logical data object or a data item within a database. Parsing at block 220 can include identification of a method defined on the target data object. Parsing at block 220 can include deserializing fields or key-value pairs from an input packet. The method can also include adapting return values of the call executed at block 250, for compliance with the source environment, or transmission of adapted return values to the source environment, where the original request issued at block 210 can be completed. In further examples, the request can be a bulk data request (e.g. for read, modify, or write) on at least 100, 1,000, 10,000, or more data objects maintained in a database layer, and the call execution at block 250 can use an expedited facility for bulk data requests which bypasses one or more intervening layers between an application layer and the database layer. The method can include receiving authorization at the target environment for a user initiating the request to access the target entity specified by the request.

Example Call

Figure 3:
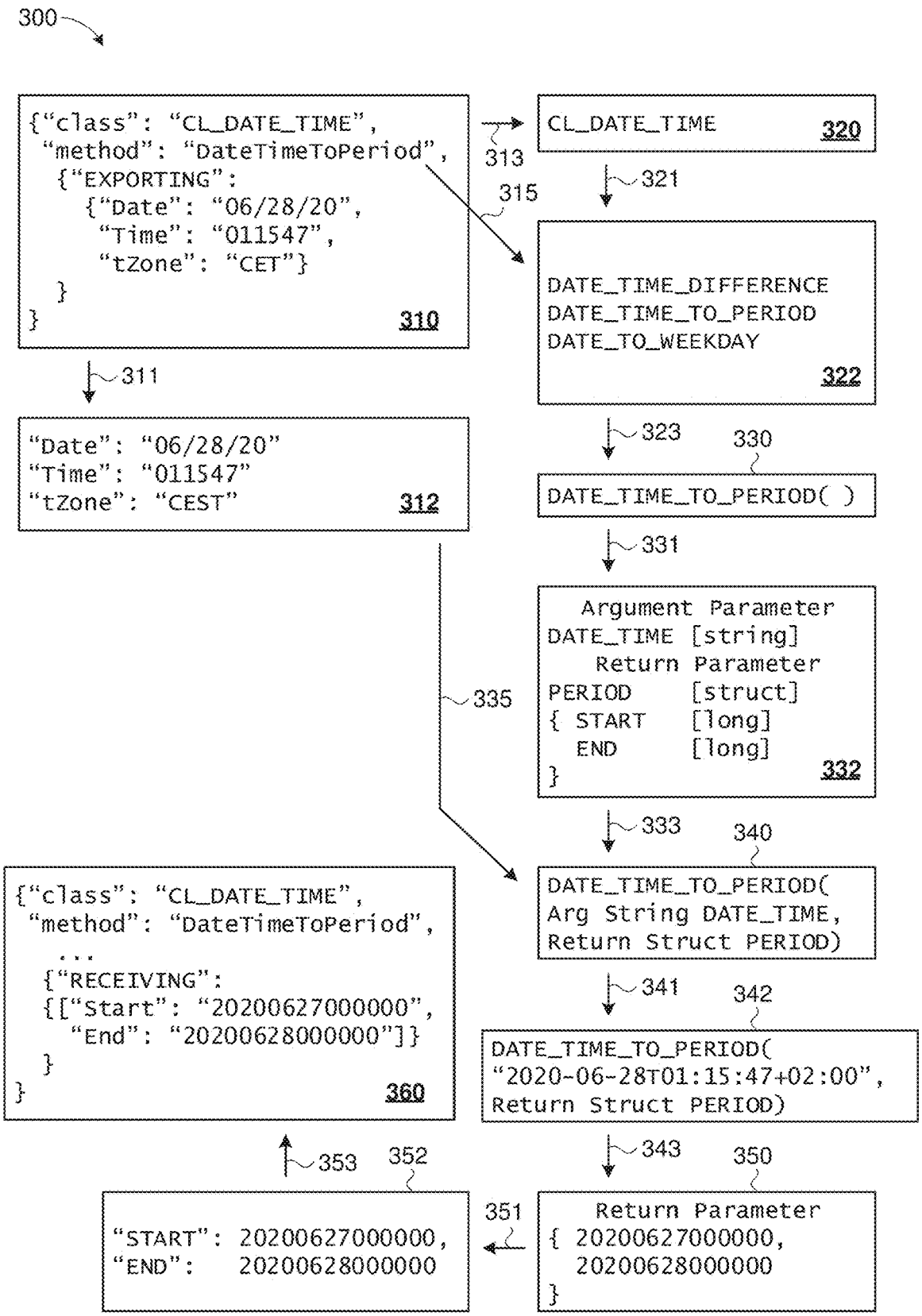
FIG. 3 is a diagram illustrating processing of an example call according to the disclosed technologies.

FIG. 3 is a dataflow diagram 300 illustrating processing of an example call according to the disclosed technologies. This example illustrates resolution of name and data inconsistencies between source and target environments. The description starts at inset 310 illustrating a JSON packet received for a utility call request. With reference to FIGS. 1-2, such a request could be received by delegation handler 170 at process block 210. While inset 310 depicts a JSON packet spanning multiple lines (as is common in the art) for clarity of illustration, the JSON packet is actually a serial text string. This utility function called in this illustration is a static function of a CL_DATE_TIME class.

Responsive to receipt of the JSON packet (310), several operations take place. The class can be extracted as indicated by arrow 313 and inset 320. In this illustration, the class name is mandated to be identical between source and target environments, and thus parsing the JSON packet immediately obtains the class as shown in inset 320. Then, a schema for the CL_DATE_TIME class can be retrieved (arrow 321) to obtain a list of functions defined on the class. Several of these functions are listed in inset 322. The source-side method name in the received JSON packet (DateTimeTo-Period) is not an exact match to the source-side defined functions of the class, because of different coding or naming styles. However, through use of standard transformations as described herein, the source-side method can be reduced to datetimetoperiod, and the middle function of inset 322 also reduces to this same name string. Arrow 315 denotes a matching procedure (using standard transformations or other techniques described herein) between the JSON method name (310) and the source-side function names (322) resulting in the desired matching function name DATE_TIME_TO_PERIOD( ), as indicated by arrow 323 and inset 330. This function is the target entity of the instant utility call, and the operations represented by arrows 313, 315, 321, 323 can be performed by block 220 of FIG. 2. Although, in this illustration, the top-level class name is mandated to exactly match between source and target environments, this is not a requirement and, in other examples, standard transformations or rules based transformations can be used to match top-level names across environments.

Further parsing of the JSON packet (310) results in extraction (arrow 311) of argument parameters in inset 322, which are three key-value pairs, for source-side parameters "Date", "Time", and "tZone" (time zone) respectively. The three key-value pairs form a 3×1 array. As such, and although the visual appearance of these key-value pairs is similar in insets 310, 312, the serial sequence of fields in 310 has been deserialized. More complex examples of deserialization are described further herein. These key-value pairs are the source side argument parameters, and the operation represented by arrow 311 can also be performed by block 220 of FIG. 2.

Continuing from inset 330, a schema of the target entity can be retrieved to obtain the calling syntax, including argument parameters, return parameters and their associated types. Operation 331 can be performed e.g. by block 230 of FIG. 2. As illustrated at inset 332, the target function takes a single argument which is a date-time string, and returns a structure (struct) having two members, each of type long. With this, a prototype call can be synthesized (arrow 333, inset 340) which depicts, in human-readable form, a representation of the call to be executed in the target environment. Arrow 335 represents reconciliation of the source-side parameters (312, "what we have") with the target-side call (340, "what we need"). The delegation handler can apply further date-time methods to convert the parameters of 312 into a date time string as shown in the middle row of inset 342. Particularly, the date time string "2020-06-28T01:15: 47+02:00" incorporates the source-side date ("06/28/20"), time ("011547"), and time zone ("CEST") transformed into a standard form date-time string, Central European Summer Time (CEST) being two hours ahead of Greenwich Mean Time (GMT). Thus, inset 342 represents the complete call ready for execution in the target environment. Operations 335 and 341 can be performed by block 240 of FIG. 2. Then, arrow 343 represents execution of the target-side call, which can be performed by block 250 of FIG. 2, and which yields the return parameter (a struct of two longs) shown in inset 350. Because the CEST time occurs the previous day, i.e. before midnight, in standard time zone GMT, the one day period for the specified time is during Jun. 27, 2020. The two longs specify midnight at the beginning of June 27 and midnight at the end of June 27 (and the beginning of June 28) respectively.

The remaining operations shown in FIG. 3 pertain to a JSON return packet transmitted back to the source environment for completion of the initial request. Because target-side call execution can be in structured form as illustrated, the return parameters contain just the data values, the meaning of these values being defined by the calling syntax (332) according to target-side schema. For a JSON response packet, the calling syntax (332) is used to prepare an array of key-value pairs as indicated by arrow 351 and inset 352. These key-value pairs are formatted according to target-side specifications, e.g. with upper case names and long values. Then, the return parameter values are converted from long to string, and the return parameter names are converted to source-side naming style (e.g. upper case to camel case) as shown. The return parameter name conversion can be performed by rules programmed for the delegation handler. The converted return parameters are built into a JSON packet as depicted in inset 360. Inset 360 includes an ellipsis " . . . " used to denote the argument parameters (310) that can optionally be included in the JSON return packet. The JSON packet (360) can also encode that the return parameters are a struct (332). The struct is illustrated as square brackets for clarity of illustration, although an actual JSON packet can use nested curly braces "{ }" instead. Like inset 310, inset 360 depicts a JSON packet spanning multiple lines for clarity of illustration, however the JSON packet shown is actually a serial text string.

Second Example Method

Figure 4:
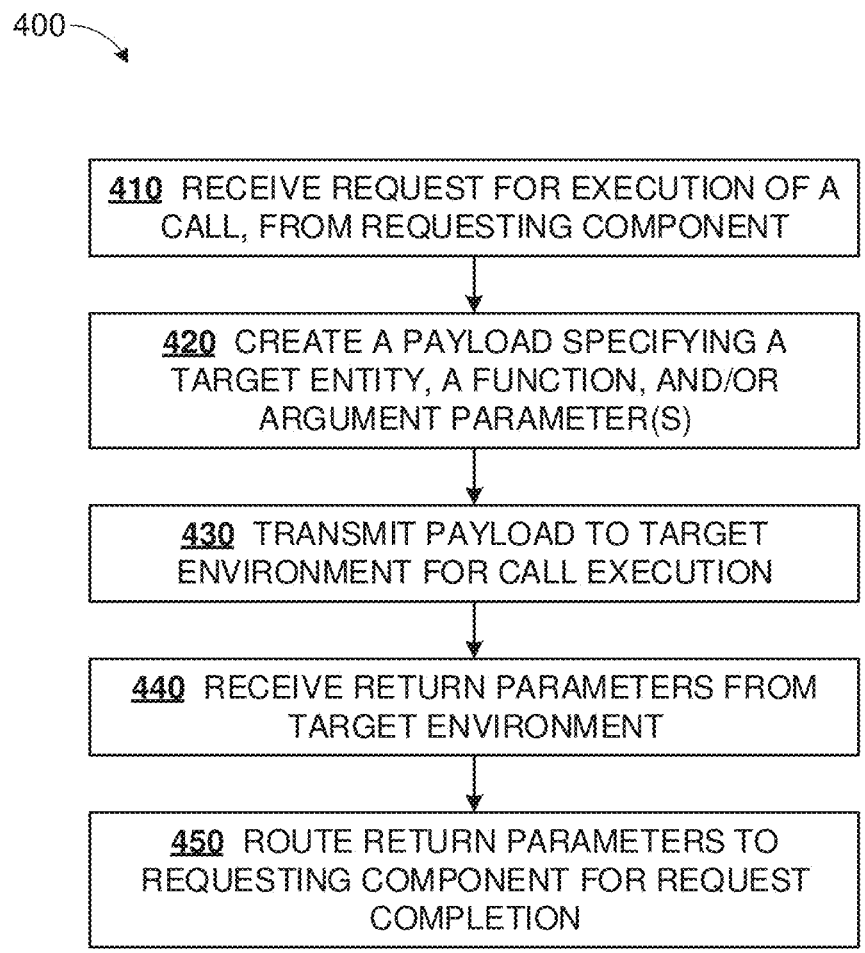
FIG. 4 is a flowchart of a second example method according to the disclosed technologies.

FIG. 4 is a flowchart 400 of a second example method that can be executed at the source environment to complement the method of FIG. 2. In this method, a call request leads to transmission of a request payload to the target environment, and return parameters from the target environment are dispatched to complete the initial call request. This method can be performed by a delegator such as 122-123, 142, 162 of FIG. 1.

At process block 410, a request can be received from a requesting software component. The request can specify a call to be delegated to a target environment, together with any argument parameters required for the call. The requesting software component can variously be a UI runtime such as 120 of FIG. 1, or an LDO such as 151-153.

At process block 420, a payload can be created specifying one or more of: a target entity, a function, or argument parameters. Where the target entity is a data object, specification of the target entity can include specifying a namespace for the target entity, and the function can be a function defined on the target data object. Where the target entity is a static function, the target entity and the function can be the same, and need not be provided twice. The payload can be a serial packet conforming to JSON or another data representation. Each field of the payload can be a key-value pair, as illustrated in FIG. 3, and argument structure, if any, can optionally be designated by brackets. JSON supports the use of both square and curly brackets to delimit a sequence of fields, with some variation in usage and syntax.

At process block 430, the request payload can be transmitted to the target system for processing and execution, for example by a method similar to that of FIG. 2. Following execution of the call, return parameters can be received from the target environment at block 440. Finally, at process block 450, the return parameters can be routed to the requesting software component for completion of the request.

Numerous variations and extensions of the second method can be implemented. For example, multiple requests can be received at block 410, e.g. for reading, modifying, or writing respective data objects, and the payload at block 420 can be a payload for a bulk data call as described herein. Then, at block 450, return values from the various data object operations can be routed to their respective requesting software components.

Third Example Method

Figure 5:
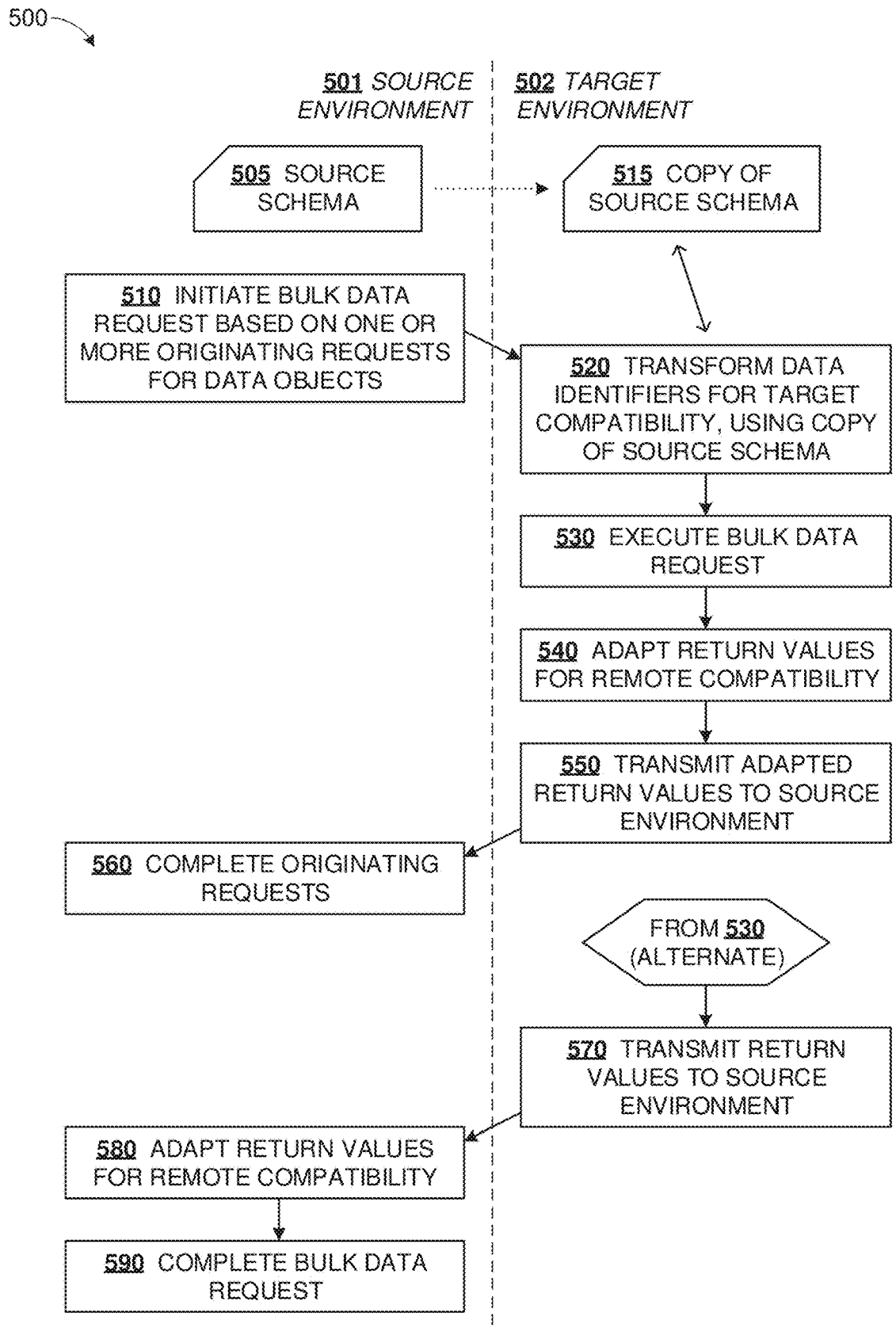
FIG. 5 is a flowchart of a third example method according to the disclosed technologies.

FIG. 5 is a flowchart 500 of a third example method according to the disclosed technologies. In this method, a bulk data request is received and processed at a target environment, with suitable adaptation between the source environment and the target environment. FIG. 5 depicts a series of actions in two lanes, corresponding to source environment 501 and target environment 502 as shown. Source environment 501 uses a source-side schema 505 which can include definitions of interfaces, views, or a data schema specifying the organization of data at the source environment. Target environment can include a copy 515 of the source schema 505.

At process block 510, a bulk data request can be initiated from the source environment 501. For example, the bulk data request can result from evaluation of one or more client requests by a UI runtime (e.g. similar to 120) and can be issued from a delegator similar to 142 or 123, in the source environment 501, to a delegation handler similar to 170 in the target environment 502. The bulk data request can contain requests for data objects unavailable within the runtime environment 501. However, these data objects can be specified relative to UI or data schemas of a virtual LDO (such as LDO 130 of FIG. 1), which can be different from schemas used in the target environment. To overcome this mismatch, copy 515 of source-side schema 505 can be used at block 520 to transform source-side data object identifiers into corresponding target-side identifiers compatible with the target environment. For example, a target-side delegation handler can refer to the copy 515 to identify a specific data object identifier targeted in the bulk data request, and thereby identify the corresponding data object identifier in the target environment.

At process block 530, the bulk data request can be executed at the target environment using the transformed identifiers derived at block 520, and obtaining corresponding return values. Thereafter, the return values can be adapted for compliance with the source environment and returned to complete the originating client request(s). FIG. 5 illustrates two variant sequences of operations for the return values. In a first variant, the return values can be adapted for compliance with the source environment at process block 540 and, at process block 550, the adapted return values can be transmitted to the source environment 501. Finally, at block 560, the originating client requests can be completed at the source environment using the adapted return values.

Process blocks 570-590 illustrate a second variant following block 530. At process block 570, the return values can be transmitted to the source environment 501 and subsequently adapted for source environment compatibility at block 580 on the source environment 501. Finally, at block 590, the originating client requests can be completed at the source environment using the adapted return values.

Numerous extensions and variations of this method can be implemented. For example, the data identifiers included in the bulk data request can be specified according to a database schema of the source computing environment, while the transformed identifiers derived at block 520 can be specified according to a database schema of the target computing environment. Block 520 can include incorporating, into the transformed identifiers, datatypes defined for the associated data objects in the target environment. Process block 530 can be executed from an application layer in the target environment, and the execution of the bulk data request at block 530 can bypass one or more software layers between the application layer and a database layer from which the requested data objects are available.

Second Example Architecture

Figure 6:
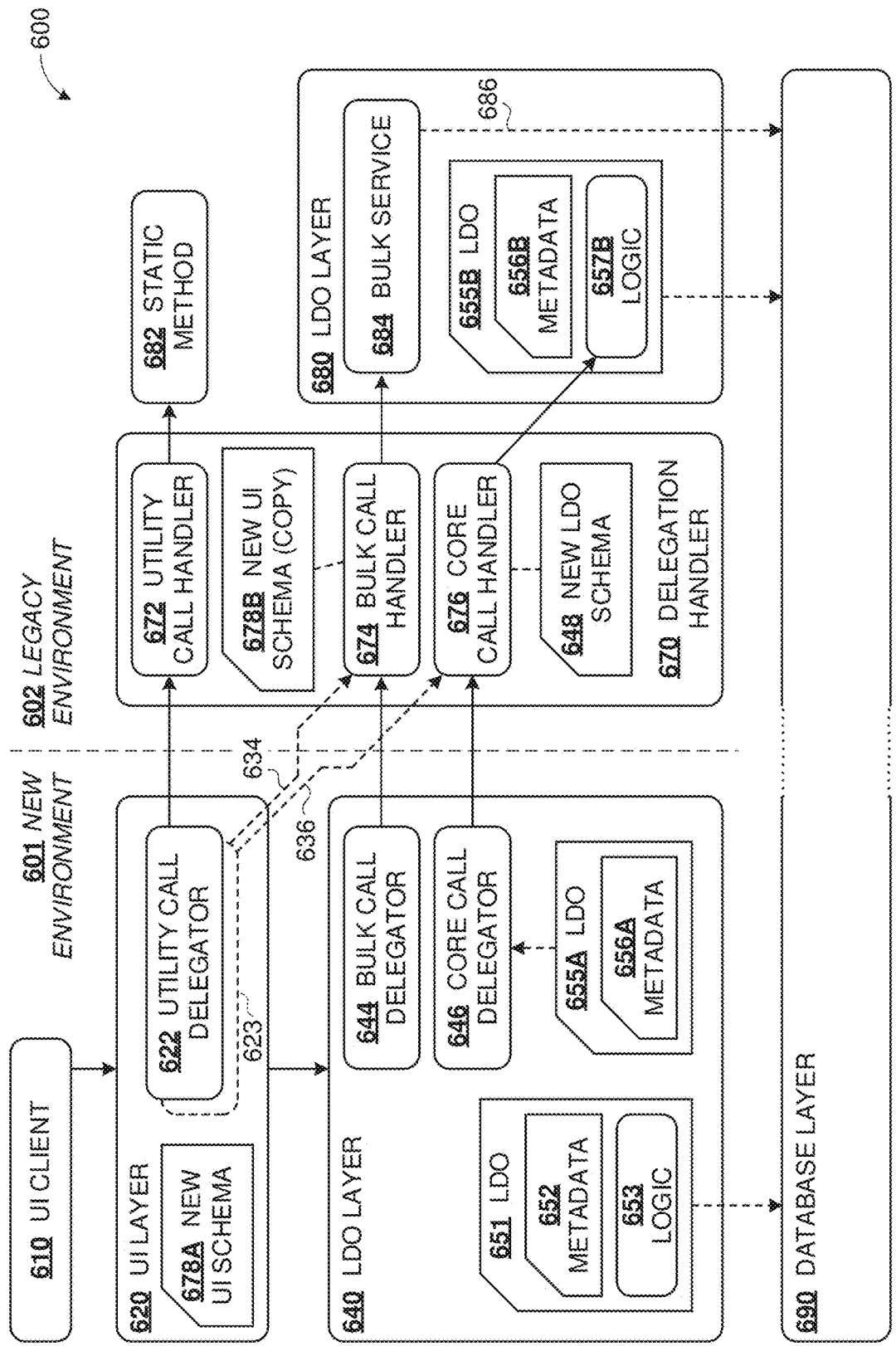
FIG. 6 is a block diagram of a second software architecture in which examples of the disclosed technologies can be implemented.

FIG. 6 is a block diagram 600 of a second software architecture in which examples of the disclosed technologies can be implemented. FIG. 6 can be used to describe phased migration of a software application from a legacy environment 602 to a new environment 601. Delegation handler 670 is a subsystem incorporating exemplary call handlers 672 for utility calls, 674 for bulk calls, and 676 for core calls. Additionally, delegation handler 670 can utilize a copy 678B of the UI schema 678A in the new environment, as well as data schema 648 used in the new environment 601. As in FIG. 1, directional arrows are shown indicating flow of execution from receipt of a client request on the source environment 601 to execution of an associated call at the target environment 602, responses or notifications can flow in a reverse direction along the depicted arrows. In some instances, undirected lines depict coupling between executable software and associated data.

The architecture of FIG. 6 can be used to service client requests, e.g. from UI client 610, received through a user interface of user interface layer 620 in new environment 601. The requests can variously include requests for utility calls and for data object calls, where the data object calls can be further divided into calls for migrating data objects (which can be migrated from legacy environment 602 to new environment 601) and for stationary data objects (which can remain in the legacy environment 602, without migration). As described below, calls can variously be processed by delegation to the legacy environment 602 or locally within the new environment 601.

In a first phase, utility calls, migrating data object calls, and stationary data object calls can all be delegated directly from UI layer 620 in the new environment 601 to delegation handler subsystem 670 in the target environment 602. To illustrate, the first phase can be an initial stage of migration, where UI layer 620 and UI client 610 have been implemented in the new environment 601 but LDO layer 640 has not been implemented. Delegation can be performed using delegators 622-623. Utility call delegator 622 is labeled, other delegators 623 can be employed for delegation of bulk calls and core calls at this stage. For example, delegators 623 can route bulk calls via dashed arrow 634 to bulk call handler 674 and can route core calls via dashed arrow 636 to core call handler 676.

In a second phase, with shells of migrating LDOs implemented within one or more LDO layers 640 of new environment 601, migrating data object calls can be delegated from LDO layers 640 to the delegation handler subsystem 670 of the target environment 602, to be serviced by first logic of the migrating LDOs still resident in the target environment 602. For example, LDO 655A can represent an LDO having its metadata 656A (but not its logic) implemented in the new environment 601, while the legacy LDO 655B is still present in the legacy environment 602. Accordingly, a core call for LDO 655A can be routed through core call delegator 646 of LDO 640 to core call handler 676 in the legacy environment. With suitable processing for legacy-side compatibility, the core call can then be routed to original LDO 655B for processing by logic 657B. LDO 655B also contains its own metadata 656B according to the data schema of the legacy environment 602. LDOs 655A, 655B can be representative of both migrating data objects and stationary data objects in the second phase.

In a third phase, LDO logic (e.g. 653) can also be implemented in LDO layers 640 of the new environment 601, migrating data object calls can be processed locally at the new environment using migrated LDO logic 653, while stationary data object calls can still be delegated from LDO layers 640 to the delegation handler subsystem 670 to be serviced by logic of the stationary LDOs within the legacy environment 602. Thus, in the third phase, LDOs 655A, 655B still represent stationary LDOs whose logic remains in the legacy environment 602, while LDO 651 can represent a migrated LDO having both metadata 652 and logic 653. Because both logic and metadata of LDO 651 are migrated to the new environment in the third phase, there is no need for a counterpart LDO in the legacy environment 602.

In the second and third phases, bulk and core calls can be routed from LDO layer 640, and delegation of these calls along the paths indicated by arrows 634, 636 is no longer required. Accordingly, for transition from first phase to second phase, utility call delegator 622 can be retained while other delegators 623 can be disabled, either by program update or by update of configuration parameters.

At the legacy environment 602, a utility call can be routed to specified static function 682 by utility call handler 672, after suitable transformation of identifiers or parameters as described herein. Transformation of a utility call can be performed with the aid of a schema of the static function 682 as described herein. A bulk call can be routed by handler 674 to bulk service 684 in LDO layer 680 of the legacy environment 602, where it can be executed using an expedited facility 686 direct to database layer 690. The bulk call handler 674 can use copy 678B of the UI schema 678A of the new environment to aid in translation of data object identifiers, as described herein. A core call can be routed by handler 676 to corresponding logic 657B of LDO 655B in the legacy environment 602. Ultimately data object calls, whether for migrated data objects, stationary data objects, or bulk data requests, reach database layer 690.

In FIG. 6, database layer is illustrated occupying a common logical position across both new environment 601 and legacy environment 602. In some examples, the environments 601, 602 can be co-located at a common landscape in a cloud, or in a common datacenter, while in other examples, environments 601, 602 can be physically separated. In some examples, the underlying database organization can be unchanged through the migration process, while in other examples, database schemas can be changed or relational database tables can be refactored. Thus, in varying examples, database tables in database layer 690 can be unaffected by a migration process, can be replicated at a new site of new environment 601, or can be transformed to conform with a new database schema for new environment 601.

Numerous variations and extensions of this architecture can be implemented. In some examples, LDO layer 640 can be implemented as a succession of sublayers, e.g. for a virtual LDO mapped precisely to the user interface capabilities of an instant software application, for underlying physical LDOs, or for an adaptation layer between virtual and physical LDOs. Other variations or extensions can be similar to those described in context of FIG. 1 herein.

Example of Structured Data

FIGS. 7A-7F are diagrams illustrating an example of structured data. This example demonstrates reconstruction of a nested data structure from a JSON serial text string.

Figures 7E, 7F:
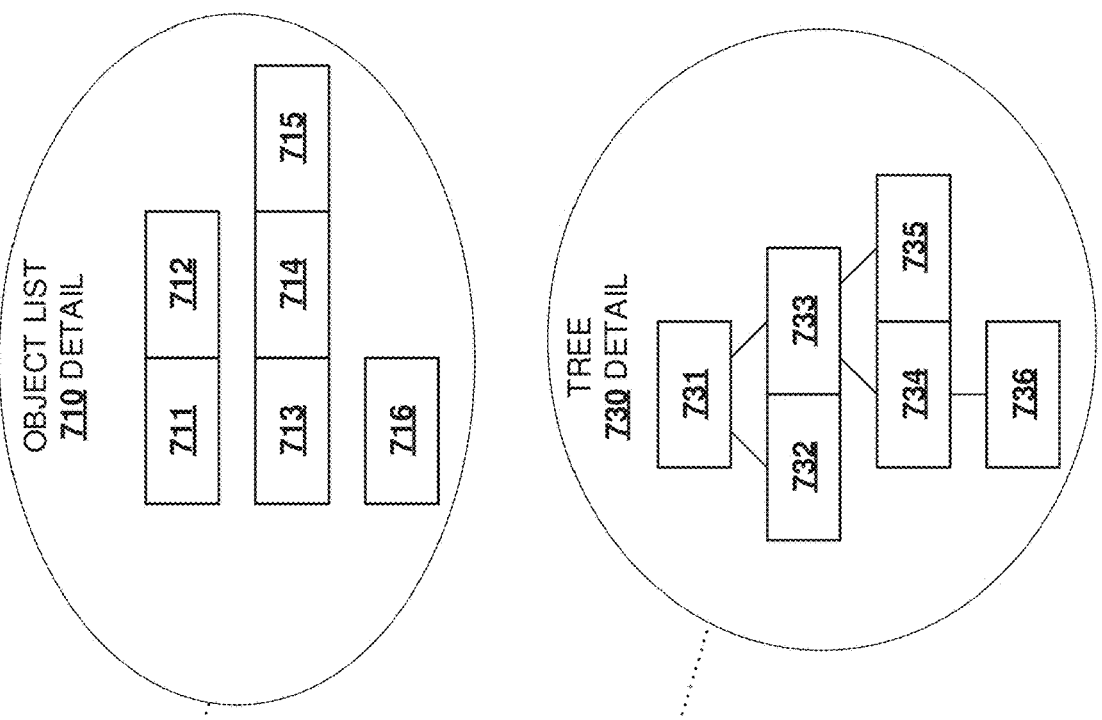

Starting with FIG. 7A, a serial JSON packet 701 is depicted following a similar style as inset 310 of FIG. 3. The illustrated example is for performing an Insert method on a data object named Object 100, using the specified Arguments. In this example, there is a single argument parameter defined by the brace pair 702, which in turn is composed of two parameters defined by brace pairs 703, 704 respectively. Within brace pair 703 are three key-value pairs for parameters named n710, n720, n730 respectively. Throughout the discussion of FIGS. 7A-7F, labels beginning with "n" indicate parameter name strings, while labels beginning with "v" indicate parameter value strings. For conciseness of illustration, and because the values of parameters n710, n720, n730 each have structure, the corresponding values are shown as "{ . . . }" in FIG. 7A, and will be described further below. Similarly, within brace pair 704 are three-key value pairs for parameters named n740, n750, n760 respectively. The value of parameter n760 is shown as "{ . . . }" indicative of further structure. However, parameters n740, n750 are simple parameters and have their value strings shown as v740, v750 respectively. Thus, the sole argument of the instant call request (702) has two parts (703, 704), each of which has three further parts. That is, the argument has the organization of a 2×3 table 705 as shown at the top of FIG. 7B. Parameters 710-760 are arranged in the 2×3 table 705 with the respective names n710-n760 of FIG. 7A. Additionally, for convenience of illustration, table 705 indicates the types of structures for several of these parameters.

Parameter 720 is a vector, having 3 members 721-723 as indicated in the inset labeled "Vector 720 Detail". FIG. 7C shows a full form of the JSON description 706 for this structure, corresponding to the { . . . } ellipsis of FIG. 7A. As shown in FIG. 7A, the value for parameter n720 contains 3 key-value pairs for parameters n721-n723 having values v721-v723 respectively. A syntax with square brackets can be used as an alternative.

Parameter 760 is a binary large object (BLOB), which is an image in this illustration, as indicated in the inset for BLOB 760 Detail. Thus, the value of n760 can be encoded as a key-value pair having name "image" and value specified as a text string, as shown at 707. As illustrated, the value is encoded as a Base64 text encoding of the corresponding binary image file data.

FIG. 7E shows a detail for object list 710 and the corresponding JSON definition 708. The JSON definition 708 has three parts, with the first part having two key-value pairs for parameters n711-n712 and their corresponding values v711-712. The second part has three key-value pairs for parameters n713-n715 and their corresponding values v713-v715. The third part has a single key-value pair for parameter n716 with value v716. That is, the three parts each represent parameter objects, and collectively these three parts form a list of objects, as depicted in the Object List 710 detail of FIG. 7E.

FIG. 7F shows a detail for tree 730 and a corresponding JSON definition 709. The definition of each tree node follows a recursive syntax {name, value {Child-1, Child-2, . . . }}. For convenience of description the JSON definition 709 has numbered lines. Line 002 defines the name and value of the root node 731 of the tree, and line 003 defines its child 732 which has no further descendants. Line 004 begins the definition of node 733 (also a child of node 731), which terminated on line 008 after its descendants are defined. Thus, lines 005-006 define the child 734 of node 733, and its child node 736, and line 008 defines child 735 of node 733 which has no further descendants. Lines 007, 009, 010 contain closing brackets for the definitions of nodes 734, 733, 731 respectively.

With these and similar approaches, data structures of arbitrary complexity can be encoded in JSON and reliably reconstituted at the source environment. Similar approaches can be used for other data encoding protocols.

ADDITIONAL EXAMPLE FEATURES

1. Data Inconsistencies

In some examples, data representations can vary between environments. For example, a source environment can utilize a Boolean datatype taking True/False values for a logical variable, while a target environment can use a text encoding such as "X" for True and " " ((space)) for False. For argument parameters, a JSON value string for "True" can be translated to "X", based on identification of the target-side argument parameter as having a logical datatype, and similarly for False. For response parameters, a return value (space) can be translated to "False" for a response parameter having a logical datatype.

In additional examples, such as those using TypeScript, one environment can use a string representation for floating point numbers, which can have a different precision than a superficially similar number represented in floating point form. Thus, translation of a JSON string "1.23" for an argument parameter can be dependent on the specific floating point datatype used for the target-side parameter.

In further examples, styles for encoding Universally Unique Identifiers (UUID) can vary as to case and delimiter characters. Accordingly, a substring " . . . 3e5f-4da7- . . . " can be translated to " . . . 3EF54DA7 . . . " while transforming argument or return parameters. Such translation can be based on a target-side datatype or on a rules engine within a delegation handler that can recognize a string as being a UUID.

In some examples, default value encoding can vary between environments. To illustrate, one environment can encode a default date value as "0000-00-00", while another environment can use empty string " " as a default date value. Appropriate translation can be based on datatype of a target side parameter and on rule based recognition of an incoming parameter string as indicating a default value.

2. Deserializer

A delegation handler can implement or invoke a function or service to deserialize a received call request packet.

In some examples, deserializing can be performed in three operations. In a first operation, the incoming fields are deserialized into a generic array of key-value pairs. In a second operation, data values can be taken into internal holding structures, e.g. extracting argument parameters from other packet contents as illustrated in inset 312. In a third operation, source-side names can be transformed into target-side names.

The key-value pairs in the generic array can variously include values encoded as the original JSON strings, as parsed values of atomic datatypes (e.g. Boolean, integer, string), or as references or pointers to a data structure in which the value is stored. In some examples, the generic array of key-value pairs can be organized according to a multi-level or nested structure implied by brackets of a JSON packet: {X: {Y: value-Y, Z: value-Z} } can indicate that X is a structure having members Y and Z with respective values value-Y, value-Z; or {X: [value-X1, value-X2] } can indicate that X is a vector having two values value-X1 and value-X2. That is, the generic array can be organized as a table of elements (similar to inset 312), as a table representing a structure, or as a table of tables representing a nested data structure. The size of the generic array or the nesting depth of data structures can be unlimited, subject to limitations of a data transfer protocol or available memory.

The holding structure can be organized as specified by a schema of the called function (e.g. as shown in inset 332). That is, data fields of the holding structure can be populated from corresponding values of the generic array of key-value pairs. The name transformation operation can be performed before populating the holding structure, and the values specified in the JSON key-value pairs can then be inserted into the appropriate positions of the holding structure. Nested data structures can be processed recursively. A holding structure can variously include atomic parameters, structures, tables of atomic datatypes, or tables of structures. In some cases, structures can be statically specified in a function schema or a data schema, while in other cases, structures can be dynamically specified. In examples, brackets in an incoming JSON packet can provide unambiguous resolution of the organization of parameters that are data structures.

Although described in context of JSON, a similar approach can be used with other communication, messaging, or data transfer protocols.

3. Serializer

A delegation handler can implement or invoke a function or service to serialize a call response packet for transmission to a source environment. Complementary to deserializing, serializing can involve generation of source-side names, data transformation on return parameters, and construction of a serial response packet (e.g. a JSON packet). Insets 352 and 360 illustrate each of these features. The return parameters of inset 352 can be a generic array of key-value pairs, using target-side names ("START"), target-side parameter values (long 20200627000000). In the response packet of inset 360, the name "START" has been transformed to camel-case style of the source environment ("Start"), the long parameter value has been transformed into a string containing untyped data ("20200627000000"), and the key-value pairs have been organized as a serial text packet. In varying examples, name conversion can be performed in-place in the generic array of inset 352 (e.g. before serializing), in-place in the JSON packet of inset 360 (e.g. after serializing), or during serializing (e.g. a target-side name can be read from the generic array, transformed, and a source-side name can be written into the JSON packet).

4. Notifications

In some situations, a notification can be returned from the target environment to the source environment in response to a call request. The notification can be in addition to, or in lieu of, return parameters. The notification can be included in a JSON packet, which can also include return parameters. Notifications can indicate error conditions, such as an invalid or failed call request; or status of a call request, such as "done"

In some examples, target-side notification technology can employ embedded calls that are executed when the notification is consumed. When used for delegated calls, such an approach can lead to cumbersome communication or network traffic between source and target environments. Accordingly, notification construction can include resolution or inlining of embedded notification fields, so that the notification can be directly consumed at the source environment.

5. Optimization

Because call delegation involves both communication overhead for and software overheads (e.g. for packet processing), some examples of the disclosed technologies can implement additional features for optimization beyond those used for local execution of calls in the target environment.

In a first scenario, a single data object may be queried many times. To avoid redundant queries, a source-side call delegator can keep track of pending calls, and eliminate or reject redundant requests. In some examples, a hash table can be used to resolve underlying data objects accessed in respective requests, and a request having a hash value that duplicates that of an existing request can be set aside. The corresponding call can be executed just once, and the same return arguments passed to both requestors.

In another scenario, the implementation of call request can result in a large data object being returned when in fact only a small portion of the data object is needed. For example, implementation of an expression X.b could be implemented as retrieving X and using just the b field of X. In some examples, source side software can be optimized to retrieve just the needed portion X.b. In other examples, the retrieved value of X can be cached on the source-side, so that subsequent requests for other fields of X, such as X.c, X.d can be efficiently fulfilled from cache without delegating additional call requests.

6. Expedited Facilities for Bulk Calls

Because of the scale and complexity of deployed software applications and associated database systems, it can be common for software applications to be organized over multiple layers. Particularly, there can be multiple middleware layers between an application layer and an underlying database layer, and propagation of a call through these multiple layers can add significant overhead, especially when repeated for many data objects. Accordingly, some target environments can implement expedited facilities for bypassing one or more intervening layers. That is, an expedited facility can act as an express elevator between an application layer and a database layer. However, use of such facility requires detailed knowledge of the database schema so that a requested data object can be accurately mapped. The benefits of such expedited facility can be particularly significant where large numbers of data objects are being requested, and hence such facilities can be preferentially used for bulk calls.

However, bulk calls can reference virtual LDO schemas (e.g. 135 of FIG. 1), which may not have target-side counterparts. To resolve this issue, a copy (e.g. 515 of FIG. 5) of the source side data schema (505) can be provided in the target environment. Then, while generating DB layer mapping for a bulk call, the copy of the source schema can be used to accurately resolve the requested data object in the target environment. (Other core calls not utilizing the expedited facility may be referenced to physical LDOs, such as 151-153 of FIG. 1, which can have pre-existing counterparts in the target environment, and can be free of this issue.)

To illustrate, source-side schemas (135 or 505) can relate user interface objects to virtual LDO 130 (enabling functioning of the source-side UI) and can also relate virtual LDO to underlying LDOs 151-153 (enabling integration of the source-side environment at least in phase two and phase three). Thus, with copies (175 or 505) of source-side schemas, a delegation handler can relate requested objects to objects defined in underlying LDOs 151-153, which inherently correspond to counterpart target-side LDOs. Accordingly, the delegation handler can map requested source-side data objects and parameters to target-side data objects and parameters, to enable use of a target-side expedited facility to service bulk call requests.

7. Data Object Names

While class, function, and call parameter names can be specified according to well-defined schemas, data objects which are instances of classes can generally be freely named. Nevertheless, data object names can be inherently matched (e.g. identical) in source and target environments. In a first case, a new object can be instantiated from the source-side. Thus, a call of type Create_New (objectClass, newObjectName) contains the name of the newly instantiated data object, and delegation of this call to the target side can create the new instance correctly named from the start. In a second case, a source-side UI can load available objects (e.g. by bulk call to the target environment), and the UI can be populated with data objects as pre-existing in the target environment, so that any calls upon these data objects can be delegated with correct target-side names.

8. Authorization

A requesting client's authorization for access to a particular data object can be transmitted to the target environment using the same core call delegator as for the associated call request. In some examples, an indication of authorization can be included within a JSON core call request packet, while in other examples, the authorization can be transmitted separately when needed. To illustrate, an authorization for an entire database can be transmitted just once, rather than separately for each data object requested within that database.

A Generalized Computer Environment

Figure 8:
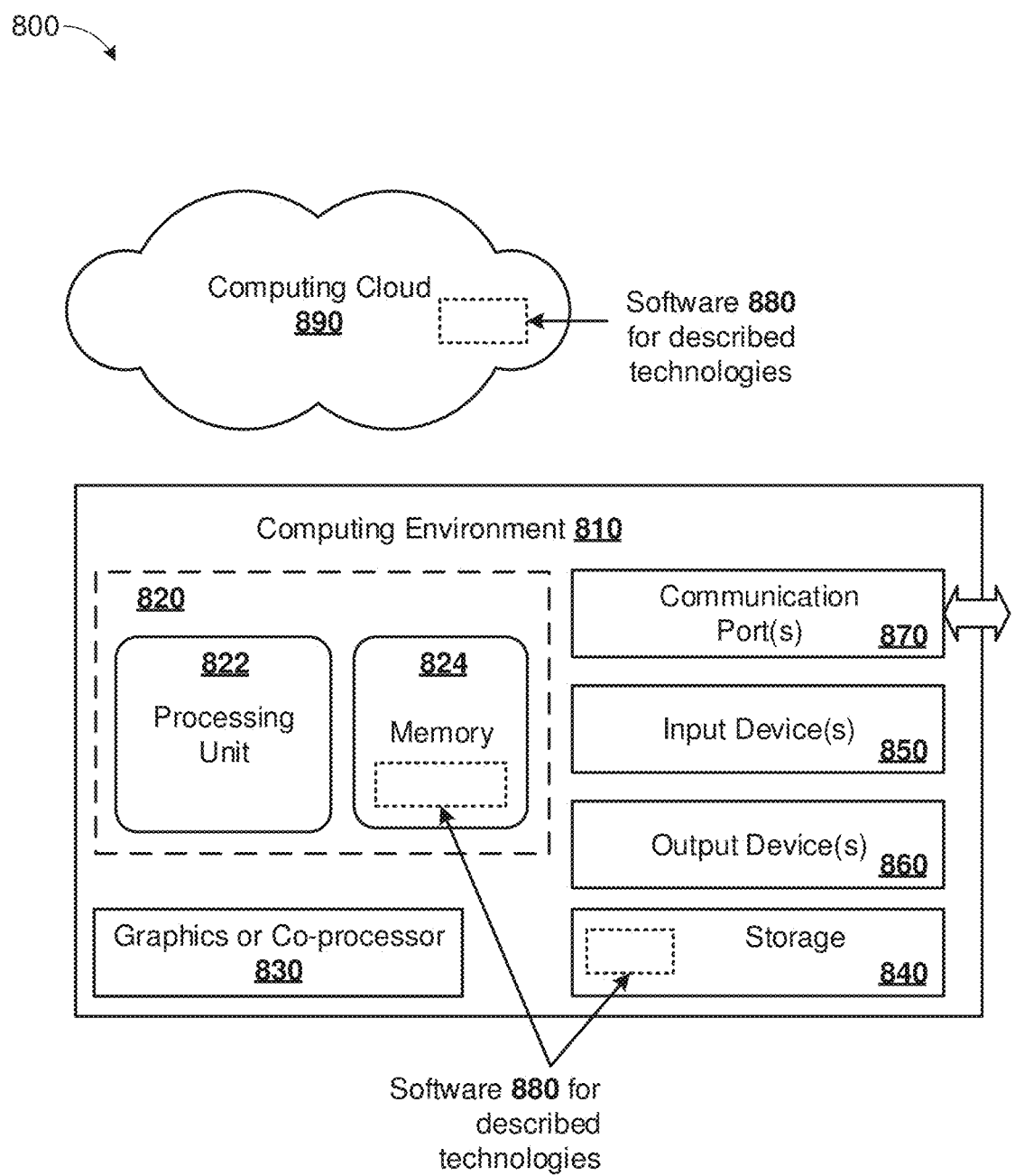
FIG. 8 is a diagram schematically depicting a computing environment suitable for implementation of disclosed technologies.

FIG. 8 illustrates a generalized example of a suitable computing system 800 in which described examples, techniques, and technologies, including construction, deployment, operation, and maintenance of call delegation software and associated infrastructure or software components can be implemented according to disclosed technologies. The computing system 800 is not intended to suggest any limitation as to scope of use or functionality of the present disclosure, as the innovations can be implemented in diverse general-purpose or special-purpose computing systems.

With reference to FIG. 8, computing environment 810 includes one or more processing units 822 and memory 824. In FIG. 8, this basic configuration 820 is included within a dashed line. Processing unit 822 executes computer-executable instructions, such as for implementing any of the methods or objects described herein for routing call requests, delegating calls, handling delegated calls, performing transformations between disparate standards or technologies, routing call responses; or various other architectures, software components, handlers, managers, modules, or services described herein. Processing unit 822 can be a general-purpose central processing unit (CPU), a processor in an application-specific integrated circuit (ASIC), or any other type of processor. In a multi-processing system, multiple processing units execute computer-executable instructions to increase processing power. Computing environment 810 can also include a graphics processing unit or co-processing unit 830. Tangible memory 824 can be volatile memory (e.g., registers, cache, or RAM), non-volatile memory (e.g., ROM, EEPROM, or flash memory), or some combination thereof, accessible by processing units 822, 830. The memory 824 stores software 880 implementing one or more innovations described herein, in the form of computer-executable instructions suitable for execution by the processing unit(s) 822, 830. The memory 824 can also store metadata or schema associated with data objects, functions, or user interfaces; request packets, response packets, data structures associated with call parameters; user interface navigation information; authorization tables; configuration data indicating a phase of migration or routing of requests among multiple software layers, environments, or handlers; other configuration data, data structures including data tables, working tables, change logs, output structures, data values, indices, or flags, as well as other operational data.

A computing system 810 can have additional features, such as one or more of storage 840, input devices 850, output devices 860, or communication ports 870. An interconnection mechanism (not shown) such as a bus, controller, or network interconnects the hardware components of the computing environment 810. Typically, operating system software (not shown) provides an operating environment for other software executing in the computing environment 810, and coordinates activities of the hardware and software components of the computing environment 810.

The tangible storage 840 can be removable or non-removable, and includes magnetic disks, magnetic tapes or cassettes, CD-ROMs, DVDs, or any other medium which can be used to store information in a non-transitory way and which can be accessed within the computing environment 810. The storage 840 stores instructions of the software 880 (including instructions and/or data) implementing one or more innovations described herein.

The input device(s) 850 can be a mechanical, touch-sensing, or proximity-sensing input device such as a keyboard, mouse, pen, touchscreen, trackball, a voice input device, a scanning device, or another device that provides input to the computing environment 810. The output device(s) 860 can be a display, printer, speaker, optical disk writer, or another device that provides output from the computing environment 810.

The communication port(s) 870 enable communication over a communication medium to another computing device. The communication medium conveys information such as computer-executable instructions or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 800 can also include a computing cloud 890 in which instructions implementing all or a portion of the disclosed technologies are executed. Any combination of memory 824, storage 840, and computing cloud 890 can be used to store software instructions or data of the disclosed technologies.

The present innovations can be described in the general context of computer-executable instructions, such as those included in program modules, being executed in a computing system on a target real or virtual processor. Generally, program modules or software components include routines, programs, libraries, software objects, classes, data structures, etc. that perform tasks or implement particular abstract data types. The functionality of the program modules can be combined or split between program modules as desired in various embodiments. Computer-executable instructions for program modules can be executed within a local or distributed computing system.

The terms "system," "environment," and "device" are used interchangeably herein. Unless the context clearly indicates otherwise, none of these terms implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Occasionally, the term "computer" is used to refer to a computing system. Virtual processors, virtual hardware, and virtualized devices are ultimately embodied in a hardware processor or another form of physical computer hardware, and thus include both software associated with virtualization and underlying hardware.

Example Cloud Computing Environment

Figure 9:
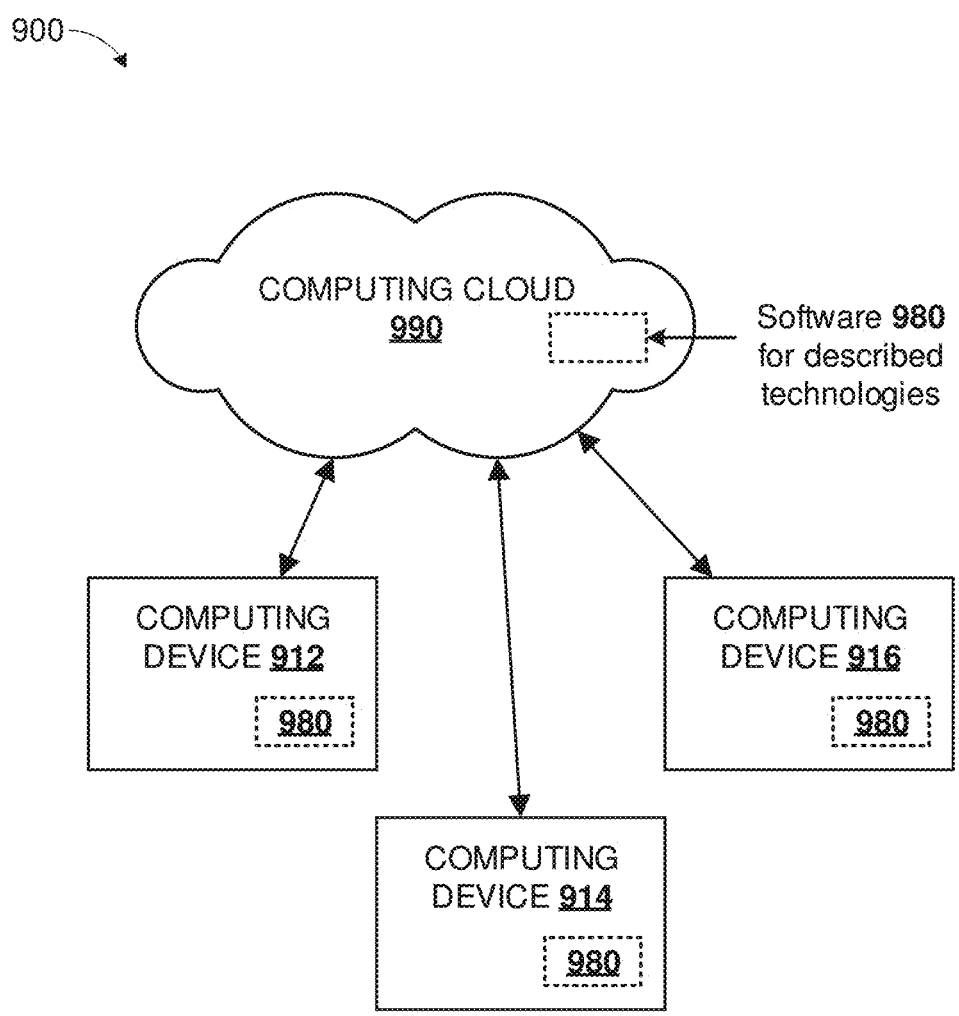
FIG. 9 is a diagram schematically depicting computing devices operating in conjunction with a computing cloud for implementation of disclosed technologies.

FIG. 9 depicts an example cloud computing environment 900 in which the described technologies can be implemented. The cloud computing environment 900 comprises a computing cloud 990 containing resources and providing services. The computing cloud 990 can comprise various types of cloud computing resources, such as computer servers, data storage repositories, networking resources, and so forth. The computing cloud 990 can be centrally located (e.g., provided by a data center of a business or organization) or distributed (e.g., provided by various computing resources located at different locations, such as different data centers and/or located in different cities or countries).

The computing cloud 990 can be operatively connected to various types of computing devices (e.g., client computing devices), such as computing devices 912, 914, and 916, and can provide a range of computing services thereto. One or more of computing devices 912, 914, and 916 can be computers (e.g., servers, virtual machines, embedded systems, desktop, or laptop computers), mobile devices (e.g., tablet computers, smartphones, or wearable appliances), or other types of computing devices. Communication links between computing cloud 990 and computing devices 912, 914, and 916 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 912, 914, and 916 can also be connected to each other.

Computing devices 912, 914, and 916 can utilize the computing cloud 990 to obtain computing services and perform computing operations (e.g., data processing, data storage, and the like). Particularly, software 980 for performing the described innovative technologies can be resident or executed in the computing cloud 990, in computing devices 912, 914, and 916, or in a distributed combination of cloud and computing devices.

General Considerations

As used in this disclosure, the singular forms "a," "an," and "the" include the plural forms unless the surrounding language clearly dictates otherwise. Additionally, the terms "includes" and "incorporates" mean "comprises." Further, the terms "coupled" or "attached" encompass mechanical, electrical, magnetic, optical, as well as other practical ways of coupling items together, and does not exclude the presence of intermediate elements between the coupled items. Furthermore, as used herein, the terms "or" and "and/or" mean any one item or combination of items in the phrase.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "adapt," "apply," "authenticate," "authorize," "call," "complete," "configure," "construct," "consume," "decode," "delegate," "deserialize," "determine," "direct," "encode," "evaluate," "execute," "extract," "forward," "generate," "handle," "identify," "indicate," "initiate," "inline," "input," "invoke," "issue," "match," "migrate," "notify," "obtain," "output," "parse," "pass," "perform," "populate," "process," "provide," "query," "read," "receive," "recognize," "reconstruct," "reconstitute," "request," "resolve," "respond," "return," "retrieve," "route," "scroll," "serialize," "serve," "service," "set," "store," "transform," "translate," "transmit," "update," "use," or "write" to indicate computer operations in a computer system. These terms denote actual operations that are performed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 8, computer-readable storage media include memory 824, and storage 840. The terms computer-readable media and computer-readable storage media do not include signals and carrier waves. In addition, the terms computer-readable media and computer-readable storage media do not include communication ports (e.g., 870) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technologies are not limited to any specific computer language or program. For instance, the disclosed technologies can be implemented by software written in ABAP, Adobe Flash, Angular, C, C++, C#, Curl, Dart, Fortran, Go, Java, JavaScript, Julia, Lisp, Matlab, Octave, Perl, Python, R, Ruby, SAS, SPSS, WebAssembly, any derivatives thereof, or any other suitable programming language, or, in some examples, markup languages such as HTML or XML, or in any combination of suitable languages, libraries, and packages. Likewise, the disclosed technologies are not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. One or more computer-readable media storing instructions which, when executed by one or more hardware processors, cause the one or more hardware processors to perform operations comprising:
   at a source computing environment, selectively handling first and second requests from a user:
      the first request causing a third request to be routed from the source computing environment to a target computing environment distinct from the source computing environment; and
      the second request being routed to local logic at the source computing environment, the local logic having been migrated from the target computing environment;
   at the target computing environment:
      receiving the third request from the source computing environment, for execution of a call;
      parsing the third request to identify a target entity and at least one source parameter;
      retrieving a schema of the identified target entity;
      using the schema to transform the at least one source parameter into at least one corresponding target parameter; and
      executing the call on the target entity with the at least one corresponding target parameter.

2. The one or more computer-readable media of claim 1, wherein the at least one source parameter is a plurality of source parameters, and the third request comprises a serial sequence of fields, without indication of respective datatypes, for the plurality of source parameters.

3. The one or more computer-readable media of claim 2, wherein the at least one corresponding target parameter is a plurality of target parameters organized as a hierarchical data structure.

4. The one or more computer-readable media of claim 1, wherein the transforming comprises applying a datatype, absent in the third request, to a given parameter of the at least one corresponding target parameter.

5. The one or more computer-readable media of claim 1, wherein the target entity is a static function defined in the target computing environment.

6. The one or more computer-readable media of claim 1, wherein the target entity is a data object defined in the target computing environment and the parsing further identifies a method defined for a class of which the data object is an instance.

7. The one or more computer-readable media of claim 6, wherein the target entity is a "logical data object," which is a collection of data together with associated methods.

8. The one or more computer-readable media of claim 1, wherein the operations further comprise:
   adapting one or more return values of the executed call for compliance with the source computing environment; and
   transmitting the one or more adapted return values to the source computing environment.

9. The one or more computer-readable media of claim 1, wherein the third request is a bulk request for at least 1,000 data items stored in a database layer, and the executed call bypasses one or more intervening layers between an application layer and the database layer.

10. The one or more computer-readable media of claim 1, wherein the third request originates from a client of the source computing environment, and the operations further comprise receiving, at the target computing environment, information of a level of access granted to the client at the source computing environment.

11. The one or more computer-readable media of claim 1, wherein the at least one source parameter is according to a first database schema specified in the source computing environment, and the at least one corresponding target parameter is according to the retrieved schema, which is a second database schema, distinct from the first database schema, used in the target computing environment.

12. The one or more computer-readable media of claim 1, wherein the transforming the at least one source parameter comprises incorporating, into the at least one corresponding target parameter, one or more datatypes defined for data objects in the target computing environment.

13. The one or more computer-readable media of claim 1, wherein the call is a bulk data request executed in an application layer, the bulk data request retrieves data objects available from a database layer, and the bulk data request bypasses one or more intervening layers between the application layer and the database layer.

14. The one or more computer-readable media of claim 1, wherein the operations further comprise:
   by the local logic at the source computing environment, handling the second request by accessing a first database layer without delegation to logic in the source computing environment; and
   at the target computing environment, handling the third request by accessing a second database layer.

15. The one or more computer-readable media of claim 14, wherein the first database layer and the second database layer are a common database layer.

16. A computer-implemented method of migrating an application from a legacy computing environment to a new computing environment, comprising:
   servicing client requests including requests for utility calls, migrating data object calls, and "stationary data object calls" (which are calls for data objects that remain in the legacy computing environment, without migration) through a user interface implemented in a user interface layer of the new computing environment;
   in a first phase, delegating the utility calls, the migrating data object calls, and the stationary data object calls directly from the user interface layer to a delegation handler subsystem in the legacy computing environment;
   in a second phase, with shells of migrating "logical data objects" (each logical data object being a collection data with associated methods) implemented in layers ("logical data object layers") of the new computing environment, delegating the migrating data object calls from the logical data object layers of the new computing environment to the delegation handler subsystem to be serviced by first logic of the migrating logical data objects in the legacy computing environment; and
   in a third phase, with second logic of the migrating logical data objects implemented in the logical data object layers of the new computing environment, processing the migrating data object calls using the second logic, and delegating the stationary data object calls from the logical data object layers of the new computing environment to the delegation handler subsystem to be serviced by third logic of stationary logical data objects, the stationary logical data objects being logical data objects which remain in the legacy computing environment, without migration;
   wherein the legacy computing environment comprises one or more computer-readable media storing instructions which, when executed by one or more hardware processors of the delegation handler subsystem, cause the delegation handler subsystem to perform operations comprising:
   receiving a given request of the client requests from the new computing environment for execution of a call;
   parsing the given request to identify a target entity and at least one source parameter;
   retrieving a schema of the target entity;
   based on the schema, transforming the at least one source parameter into at least one corresponding target parameter; and
   executing the call on the target entity with the at least one corresponding target parameter.

17. The computer-implemented method of claim 16, wherein the delegation handler subsystem comprises a plurality of handlers accepting respective call types among the utility calls, the migrating data object calls, and the stationary data object calls.

18. The computer-implemented method of claim 16, wherein at least one call type among the utility calls, the migrating data object calls, and the stationary data object calls is delegated by forwarding calls of the at least one call type, wherein the forwarded calls have, as parameters, data objects identified by first identifiers defined in the new computing environment, wherein the first identifiers are to be transformed by the delegation handler subsystem into second identifiers of the data objects as defined in the legacy computing environment.

19. The computer-implemented method of claim 16, further comprising receiving responses from the legacy computing environment to complete the client requests at the new computing environment, in each of the first, second, and third phases.

20. A system comprising:
   a plurality of hardware processors, with memory coupled thereto, in distinct source and target computing environments; and one or more computer-readable media storing instructions executable by the hardware processors and comprising:
first instructions which, when executed at the source computing environment, cause first and second requests from a user to be selectively handled by:
for the first request by routing a third request from the source computing environment to the target computing environment; and
routing the second request to local logic at the source computing environment, the local logic having been migrated from the target computing environment;
second instructions which, when executed, cause the target computing environment to receive a request from a source computing environment for execution of a call;
third instructions which, when executed, parse the request to identify a target entity and at least one source parameter;
fourth instructions which, when executed, cause a schema of the target entity to be retrieved;
fifth instructions which, when executed, transform the at least one source parameter into at least one corresponding target parameter, based on the schema; and
sixth instructions which, when executed, cause the call to be executed on the target entity with the at least one corresponding target parameter.

* * * * *